(12) United States Patent
Xie et al.

(10) Patent No.: US 10,365,776 B2
(45) Date of Patent: Jul. 30, 2019

(54) TOUCH SUBSTRATE, TOUCH PANEL, TOUCH DISPLAY APPARATUS, MASK PLATE, AND FABRICATING METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xiaodong Xie, Beijing (CN); Xibin Shao, Beijing (CN); Ming Hu, Beijing (CN); Ming Zhang, Beijing (CN); Jing Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 15/564,903

(22) PCT Filed: Nov. 4, 2016

(86) PCT No.: PCT/CN2016/104722
§ 371 (c)(1),
(2) Date: Oct. 6, 2017

(87) PCT Pub. No.: WO2018/082050
PCT Pub. Date: May 11, 2018

(65) Prior Publication Data
US 2018/0307343 A1    Oct. 25, 2018

(51) Int. Cl.
G06F 3/044    (2006.01)
G06F 3/047    (2006.01)
G06F 3/041    (2006.01)

(52) U.S. Cl.
CPC .............. G06F 3/044 (2013.01); G06F 3/047 (2013.01); G06F 3/0416 (2013.01);
(Continued)

(58) Field of Classification Search
CPC ........ G06F 3/044; G06F 3/0416; G06F 3/047; G06F 2203/04103; G06F 2203/04112; G02F 2201/08
See application file for complete search history.

(56) References Cited

U.S. PATENT DOCUMENTS

2003/0112227 A1* 6/2003 Hong ..................... G06F 3/045
                                                            345/173
2013/0327560 A1    12/2013 Ichiki
(Continued)

FOREIGN PATENT DOCUMENTS

CN    103380411 A    10/2013
CN    104111748 A    10/2014
(Continued)

OTHER PUBLICATIONS

International Search Report & Written Opinion dated Jul. 27, 2017 regarding PCT/CN2016/104722.

*Primary Examiner* — Stephen G Sherman
(74) *Attorney, Agent, or Firm* — Intellectual Valley Law, P.C.

(57) ABSTRACT

The present application discloses a touch substrate including a base substrate, and a touch electrode layer on the base substrate having a first region having a plurality of first mesh electrode patterns, a second region having a plurality of second mesh electrode patterns corresponding to the plurality of first mesh electrode patterns, and an interface region between the first region and the second region. Each of the plurality of first mesh electrode patterns includes a plurality of first mesh electrode lines having a first line width. A corresponding second mesh electrode pattern includes a
(Continued)

plurality of second mesh electrode lines corresponding to the plurality of first mesh electrode lines and having the first line width. The first mesh electrode line in the interface region has a second line width no less than the first line width.

12 Claims, 19 Drawing Sheets

(52) U.S. Cl.
CPC .................. *G02F 2201/08* (2013.01); *G06F 2203/04103* (2013.01); *G06F 2203/04112* (2013.01)

(56) References Cited

U.S. PATENT DOCUMENTS

| | | |
|---|---|---|
| 2014/0210784 A1 | 7/2014 | Gourevitch et al. |
| 2014/0313435 A1 | 10/2014 | Cho et al. |
| 2016/0018348 A1 | 1/2016 | Yau et al. |
| 2016/0306464 A1 | 10/2016 | Lee |

FOREIGN PATENT DOCUMENTS

| | | |
|---|---|---|
| CN | 104750311 A | 7/2015 |
| CN | 105278739 A | 1/2016 |
| CN | 105849681 A | 8/2016 |
| CN | 106020527 A | 10/2016 |
| CN | 106055135 A | 10/2016 |
| JP | 2015158840 A | 9/2015 |

* cited by examiner

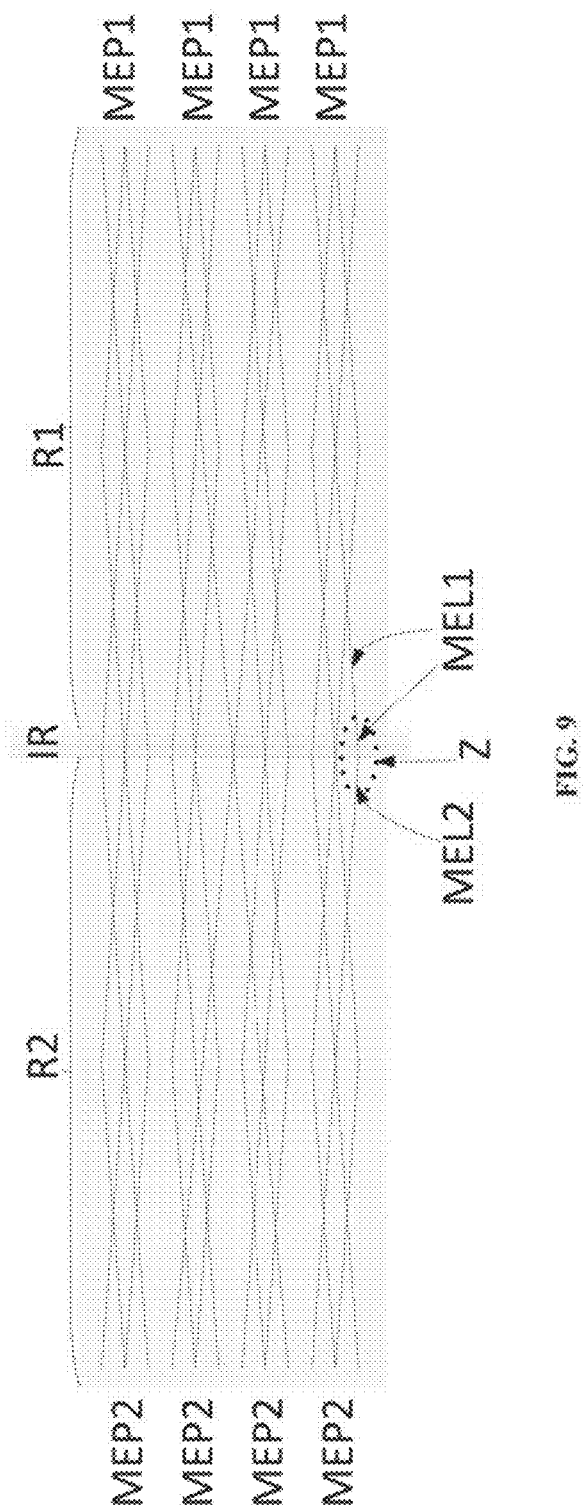

TOUCH SUBSTRATE, TOUCH PANEL, TOUCH DISPLAY APPARATUS, MASK PLATE, AND FABRICATING METHOD

TECHNICAL FIELD

The present invention relates to touch display technology, more particularly, to a touch substrate, a touch panel and a touch display apparatus having the same, a mask plate, and a fabricating method thereof.

BACKGROUND

Large size touch display panels are becoming popular in recent years. Conventional touch display panels typically use indium tin oxide as the touch electrode material. For large size touch display panels, however, there are some issues with the indium tin oxide touch electrodes. Due to a relatively large resistance of indium tin oxide material, a large size touch display panel requires an indium tin oxide touch electrode having a relatively large thickness. The relatively large thickness results in a lower light transmission in the display panel. High display quality large size touch display panels having a touch electrode made of other materials have become a focus of research and development.

SUMMARY

In one aspect, the present disclosure provides a touch substrate comprising a base substrate; a touch electrode layer on the base substrate comprising a first region having a plurality of first mesh electrode patterns, a second region having a plurality of second mesh electrode patterns corresponding to the plurality of first mesh electrode patterns, and an interface region between the first region and the second region; each of the plurality of first mesh electrode patterns comprising a plurality of first mesh electrode lines having first line width, a corresponding second mesh electrode pattern comprising a plurality of second mesh electrode lines corresponding to the plurality of first mesh electrode lines and having the first line width; the plurality of first mesh electrode lines extend from the first region into the interface region; a pair of corresponding first mesh electrode line and second mesh electrode line being electrically connected to each other in the interface region; wherein the first mesh electrode line in the interface region has a second line width no less than the first line width.

Optionally, the first mesh electrode line in the interface region is offset from the corresponding second mesh electrode line.

Optionally, the first mesh electrode line in the interface region is offset from the corresponding second mesh electrode line by an offset width less than the first line width.

Optionally, the interface region has a width along a direction from the second region to the first region in a range of approximately 1 mm to approximately 5 mm.

Optionally, the first mesh electrode line in the interface region has a substantially uniform width; and the second line width is substantially the same as the first line width.

Optionally, the first mesh electrode line and the second mesh electrode line are directly connected to each other in the interface region.

Optionally, the first mesh electrode line and the second mesh electrode line are electrically connected through an interface electrode block having a width larger than the first line width and the second line width.

Optionally, the touch electrode layer further comprises a peripheral mesh electrode pattern along an edge of the touch electrode layer comprising a plurality of peripheral mesh electrode lines having a line width larger than the first line width.

Optionally, the first line width and the second line width are approximately 8 μm; and the peripheral mesh electrode line has a line width in a range of approximately 13 μm to approximately 20 μm.

Optionally, the touch electrode layer is a metal mesh touch electrode layer, the plurality of first mesh electrode patterns are a plurality of first metal mesh electrode patterns, and the plurality of second mesh electrode patterns are a plurality of second metal mesh electrode patterns.

Optionally, the touch electrode layer is a touch sensing electrode layer; the touch substrate further comprising a touch scanning electrode layer, and an insulating layer between the touch sensing electrode layer and the touch scanning electrode layer; the touch scanning electrode layer comprising a third region having a plurality of third mesh electrode patterns, a fourth region having a plurality of fourth mesh electrode patterns corresponding to the plurality of third mesh electrode patterns, and a second interface region between the third region and the fourth region; each of the plurality of third mesh electrode patterns comprising a plurality of third mesh electrode lines having a third line width, a corresponding fourth mesh electrode pattern comprising a plurality of fourth mesh electrode lines corresponding to the plurality of third mesh electrode lines and having the third line width; the plurality of third mesh electrode lines extend from the third region into the second interface region; a pair of corresponding third mesh electrode line and fourth mesh electrode line being electrically connected to each other in the second interface region; wherein the third mesh electrode line in the interface region has a fourth line width no less than the third line width.

In another aspect, the present disclosure provides a mask plate for fabricating a mesh electrode touch electrode layer, comprising a plurality of first mask patterns, each of the plurality of first mask patterns comprising a plurality of first mask lines having a first line width; and a second mask pattern comprising a plurality of second mask lines having a second line width larger than the first line width, the plurality of second mask lines being disposed along an edge of the mask plate.

Optionally, the first line width is approximately 8 μm; and the second line width is in a range of approximately 13 μm to approximately 20 μm.

In another aspect, the present disclosure provides a method of fabricating a touch electrode layer, comprising forming a conductive electrode material layer comprising a conductive electrode material on a base substrate; forming a photoresist layer comprising a photoresist material on a side of the conductive electrode material layer distal to the base substrate; placing the mask plate described above on a first region of the photoresist layer; the first region corresponding to the plurality of first mask patterns; exposing the first region of the photoresist layer with the mask plate; developing the exposed photoresist layer in the first region to obtain a photoresist pattern comprising a first section corresponding to the plurality of first mask patterns in the first region and a second section outside of the first section in the first region, the photoresist material in the second section is removed; and removing the conductive electrode material layer in the second section, thereby forming a plurality of first mesh electrode patterns in the first region; each of the plurality of first mesh electrode patterns comprising a plurality of first mesh electrode lines having the first line width.

Optionally, the mask plate is placed on the first region and a peripheral region of the photoresist layer; the peripheral region corresponding to the second mask pattern; the first region and the peripheral region of the photoresist layer are exposed with the mask plate; and the photoresist pattern further comprises a third section corresponding to the second mask pattern in the peripheral region and a fourth section outside of the third section in the peripheral region, the photoresist material in the fourth section is removed; the method further comprising removing the conductive electrode material layer in the fourth section, thereby forming a peripheral mesh electrode pattern in the peripheral region; the peripheral mesh electrode pattern comprising a plurality of peripheral mesh electrode lines having a second line width larger than the first line width.

Optionally, the method further comprises placing the mask plate on the photoresist layer; a first portion of the mask plate corresponding to the plurality of first mask patterns being placed on a second region of the photoresist layer; a second portion of the mask plate corresponding to the second mask pattern being placed an interface region of the photoresist layer; the second region being non-overlapping with the first region; the interface region being overlapping with the first region; the plurality of second mask lines completely covering the plurality of first mesh electrode lines in the interface region; exposing the second region and the interface region of the photoresist layer with the mask plate; developing the exposed photoresist layer in the second region and the interface region to obtain a photoresist pattern comprising a fifth section corresponding to the plurality of first mask patterns in the second region, a sixth section corresponding to the second mask pattern in the interface region, and a seventh section outside of the fifth section and the sixth section in the second region and the interface region; the photoresist material in the sixth section is removed; and removing the conducive electrode material layer in the sixth section, thereby forming a plurality of second mesh electrode patterns in the second region; each of the plurality of second mesh electrode patterns comprising a plurality of second mesh electrode lines corresponding to the plurality of first mesh electrode lines; the plurality of first mesh electrode lines in the interface region remaining unremoved; a pair of corresponding first mesh electrode line and second mesh electrode line being electrically connected to each other in the interface region; the first mesh electrode line remained in the interface region has a third line width no less than the first line width.

In another aspect, the present disclosure provides a method of fabricating a touch panel, comprising forming a black matrix layer on a substrate; and forming a touch electrode layer according to a method described above; wherein the forming the black matrix layer comprises forming a black matrix material layer comprising a black matrix material on a base substrate; forming a second photoresist layer on a side of the black matrix material layer distal to the base substrate; placing a second mask plate on a first region of the second photoresist layer; the second mask plate having a first light transmissive portion corresponding to a portion of the black matrix layer and a second light transmissive portion outside the black matrix layer; shielding the second photoresist layer in an area corresponding to the second transmissive portion from exposure using a baffle plate; exposing the first region of the second photoresist layer with the second mask plate and the baffle plate; developing the exposed second photoresist layer in the first region to obtain a second photoresist pattern corresponding to the first light transmissive portion; photoresist material in the first region outside of an area corresponding to the first light transmissive portion is removed; and removing the black matrix material in the first region outside of the area corresponding to the first light transmissive portion.

Optionally, the method further comprises repeating the steps of forming the black matrix layer in other regions of the second photoresist layer until the black matrix layer is formed.

Optionally, the touch electrode layer is a touch sensing electrode layer; the method further comprising forming a touch scanning electrode layer according to the method described above; and forming an insulating layer between the touch sensing electrode layer and the touch scanning electrode layer.

In another aspect, the present disclosure provides a touch panel comprising a touch substrate described herein or fabricated by a method described herein.

In another aspect, the present disclosure provides a touch display apparatus comprising a touch panel described herein.

BRIEF DESCRIPTION OF THE FIGURES

The following drawings are merely examples for illustrative purposes according to various disclosed embodiments and are not intended to limit the scope of the present invention.

FIG. 9 is a diagram illustrating the structure of a touch substrate in some embodiments according to the present disclosure.

DETAILED DESCRIPTION

The disclosure will now be described wore specifically with reference to the following embodiments. It is to be noted that the following descriptions of some embodiments are presented herein for purpose of illustration and description only. It is not intended to be exhaustive or to be limited to the precise form disclosed.

A conventional mask plate for forming the touch electrode layer is smaller than a large size (e.g., 65 inch or more) touch panel. When fabricating a large size touch panel having a metal mesh touch electrode layer, it is required to repeat the patterning process several times using a same mask plate on the difference regions of the substrate in order to obtain a complete touch electrode layer. Typically, two sequential patterning processes are performed in two adjacent regions that are partially overlapping. If two sequential patterning processes are performed in two non-overlapping regions, the metal mesh electrodes formed in two regions are not electrically connected.

Figure 1A:
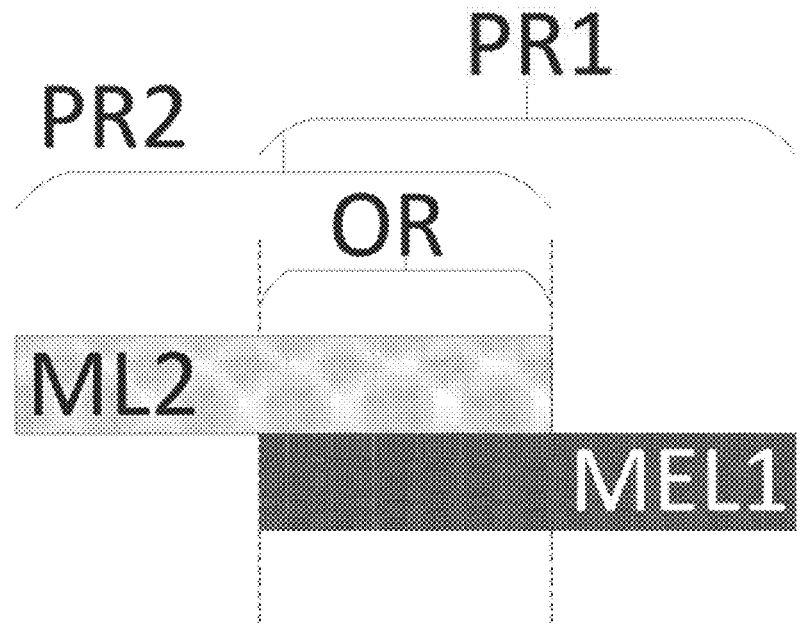
FIGS. 1A-1B illustrate a patterning process in some embodiments according to the present disclosure.
Figure 1B:
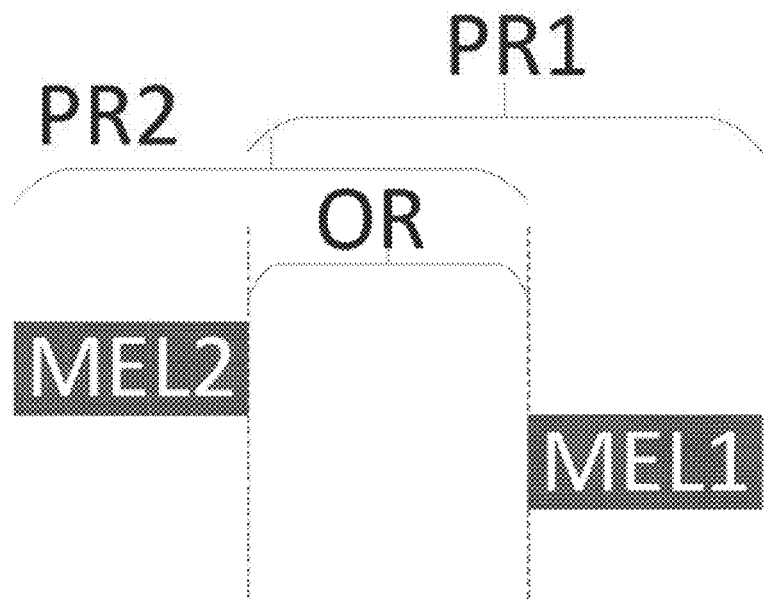

FIGS. 1A-1B illustrate a patterning process in some embodiments according to the present disclosure. Referring to FIG. 1A, in a first patterning process, a first mesh electrode line MEL1 is formed in a first patterning region PR1 (including an overlapping patterning region OR). Once the first mesh electrode line MEL1 is formed, a second patterning process is performed using a mask plate having a mask line ML2. As shown in FIG. 1A, the second patterning process is performed in a second patterning region PR2, which overlaps with the first patterning region PR1 forming the overlapping patterning region OR. The mask line ML2 does not overlap with the first mesh electrode line MEL1 formed in the first patterning process.

Referring to FIG. 1B, when the second patterning process is complete, the first mesh electrode line MEL1 in the overlapping patterning region OR is removed (e.g., etched during the second patterning process). A second mesh electrode line MEL2 is formed in the second patterning region PR2 outside of the overlapping patterning region OR. As shown in FIG. 1B, the first mesh electrode line MEL1 and the second mesh electrode line MEL2 are not electrically connected.

Figure 2A:
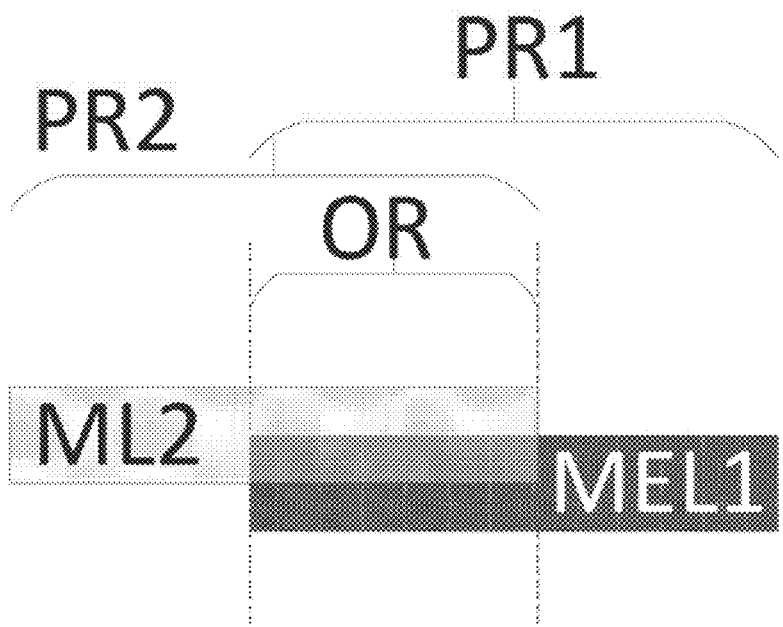
FIGS. 2A-2B illustrate a patterning process in some embodiments according to the present disclosure.
Figure 2B:
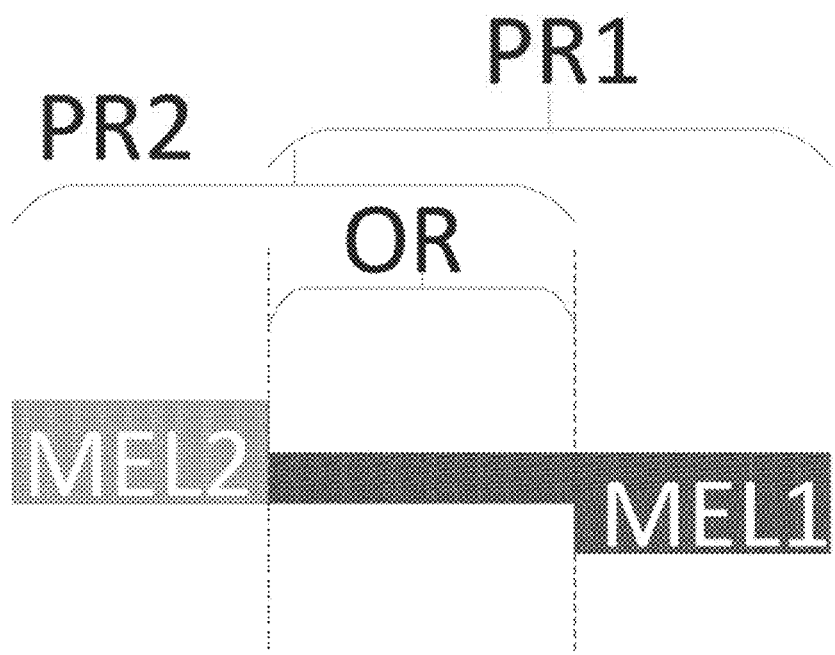

FIGS. 2A-2B illustrate a patterning process in some embodiments according to the present disclosure. Referring to FIG. 2A, in a first patterning process, a first mesh electrode line MEL1 is formed in a first patterning region PR1 (including an overlapping patterning region OR). Once the first mesh electrode line MEL1 is formed, a second patterning process is performed using a mask plate having a mask line ML2. As shown in FIG. 2A, the second patterning process is performed in a second patterning region PR2, which overlaps with the first patterning region PR1 forming the overlapping patterning region OR. The mask line ML2 partially overlap with the first mesh electrode line MEL1 formed in the first patterning process.

Referring to FIG. 2B, when the second patterning process is complete, a portion of the first mesh electrode line MEL1 in the overlapping patterning region OR is removed (e.g., etched during the second patterning process). A second mesh electrode line MEL2 is formed in the second patterning region PR2 outside of the overlapping patterning region OR. As shown in FIG. 2B, the first mesh electrode line MEL1 in the overlapping patterning region OR has a line width smaller than that of the first mesh electrode line MEL1 outside of the overlapping patterning region OR.

Figure 3A:
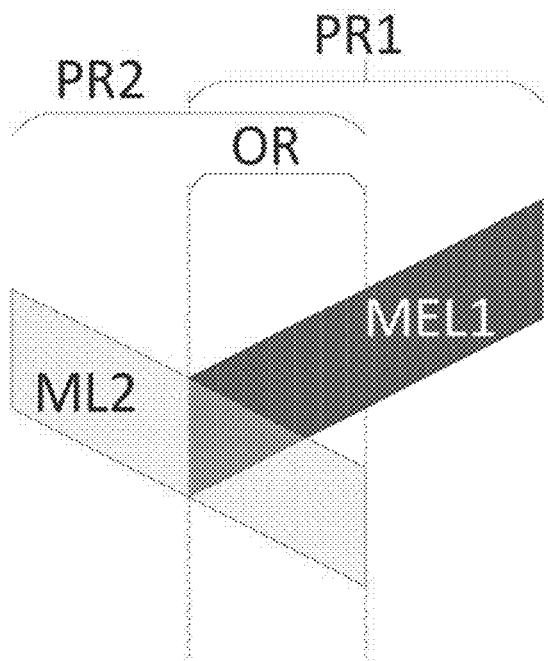
FIGS. 3A-3B illustrate a patterning process in some embodiments according to the present disclosure.
Figure 3B:
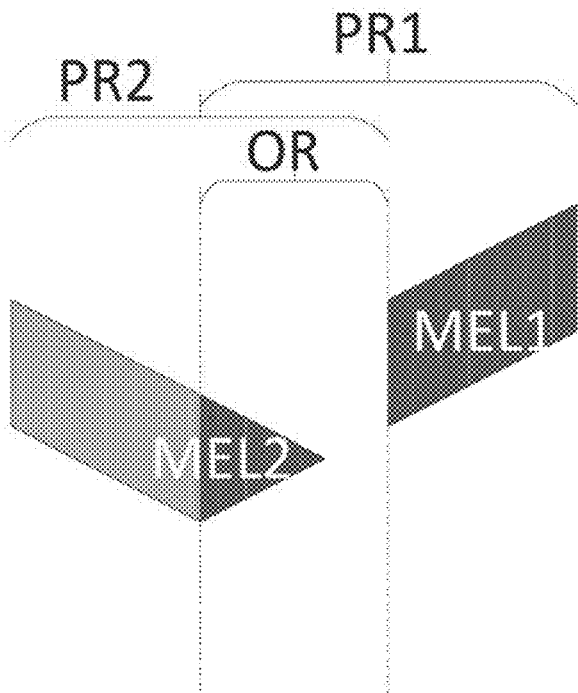

FIGS. 3A-3B illustrate a patterning process in some embodiments according to the present disclosure. Referring to FIG. 3A, in a first patterning process, a first mesh electrode line MEL1 is formed in a first patterning region PR1 (including an overlapping patterning region OR). The first mesh electrode line MEL1 is at an angle with the mask line ML2 to be used in the second patterning process. Once the first mesh electrode line MEL1 is formed, the second patterning process is performed using a mask plate having the mask line ML2. As shown in FIG. 3A, the second patterning process is performed in a second patterning region PR2, which overlaps with the first patterning region PR1 forming the overlapping patterning region OR. The mask line ML2 partially overlap with the first mesh electrode line MEL1 formed in the first patterning process.

Referring to FIG. 3B, when the second patterning process is complete, a portion of the first mesh electrode line MEL1 in the overlapping patterning region OR is removed (e.g., etched during the second patterning process). A second mesh electrode line MEL2 is formed in the second patterning region PR2 outside of the overlapping patterning region OR. As shown in FIG. 3B, the first mesh electrode line MEL1 in the overlapping patterning region OR is open, and the second mesh electrode line MEL2 is not electrically connected to the first mesh electrode line MEL1 outside of the overlapping patterning region OR.

Figure 4A:
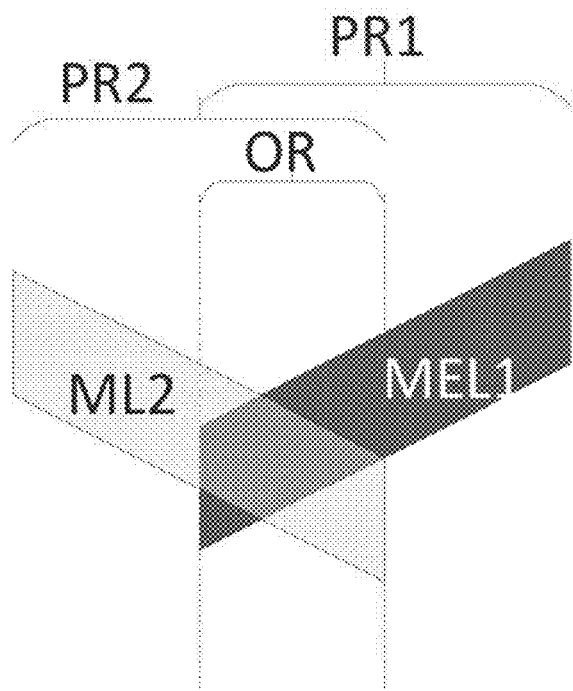
FIGS. 4A-4B illustrate a patterning process in some embodiments according to the present disclosure.
Figure 4B:
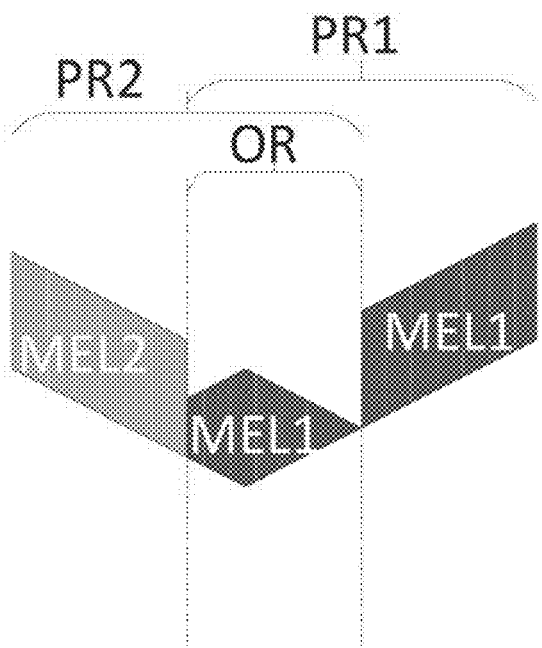

FIGS. 4A-4B illustrate a patterning process in some embodiments according to the present disclosure. Similar to the process illustrated in FIG. 3A, the mask line ML2 in FIG. 4A only partially overlap with the first mesh electrode line MEL1 formed in the first patterning process. As a result, when the second patterning process is complete, a portion of the first mesh electrode line MEL1 in the overlapping patterning region OR is removed. The first mesh electrode line MEL1 in the overlapping patterning region OR has a non-uniform width.

Thus, in the process of fabricating a large size touch panel having a metal mesh touch electrode layer, many problems occur in the overlapping patterning region, resulting in high occurrence of defects in the touch panel. Accordingly, the present invention provides, inter alia, a touch substrate, a touch panel and a touch display apparatus having the same, a mask plate, and a fabricating method thereof that substantially obviate one or more of the problems due to limitations and disadvantages of large size touch panel fabrication.

Figure 5A:
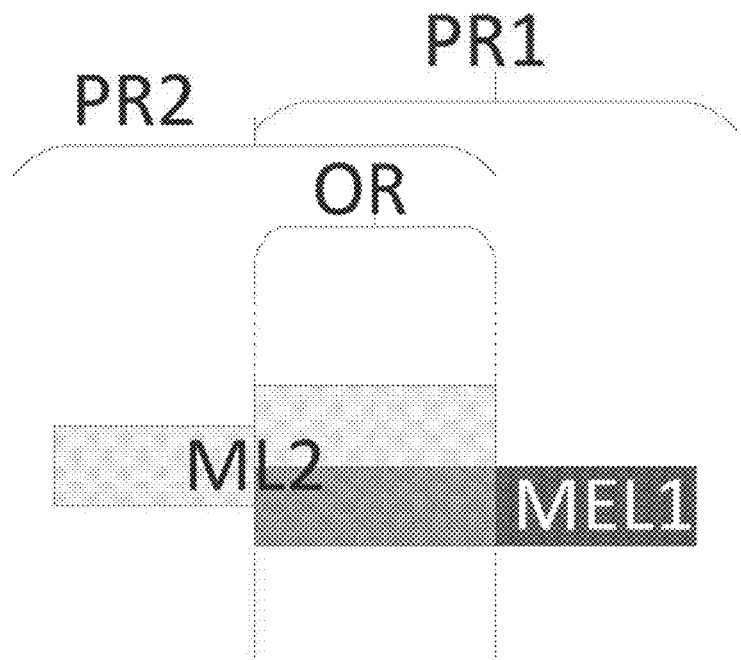
FIGS. 5A-5B illustrate a patterning process in some embodiments according to the present disclosure.
Figure 5B:
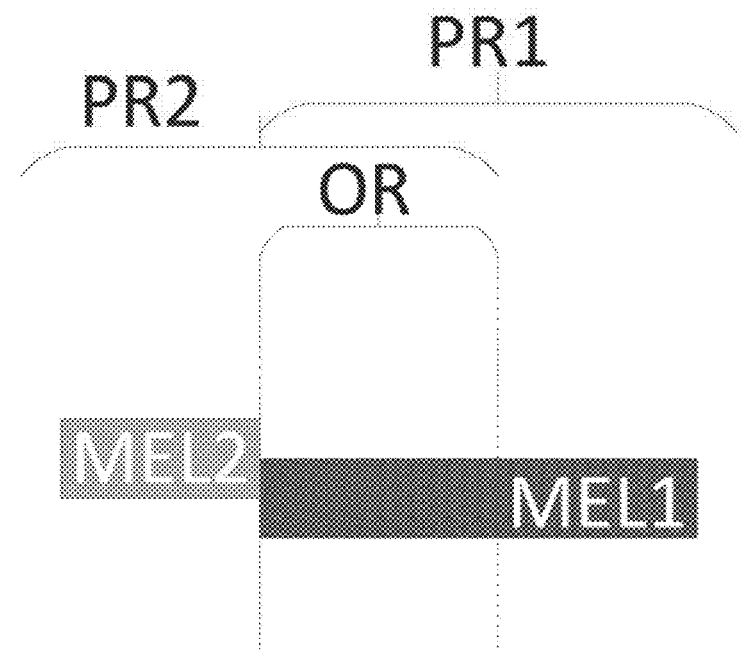

FIGS. 5A-5B illustrate a patterning process in some embodiments according to the present disclosure. Referring to FIG. 5A, in a first patterning process, a first mesh electrode line MEL1 is formed in a first patterning region PR1 (including an overlapping patterning region OR). Once the first mesh electrode line MEL1 is formed, a second patterning process is performed using a mask plate having a mask line ML2. As shown in FIG. 5A, the second patterning process is performed in a second patterning region PR2, which overlaps with the first patterning region PR1 forming the overlapping patterning region OR. The mask line ML2 has a first portion in the overlapping patterning region OR and a second portion outside of the overlapping patterning region OR in the second patterning region PR2. The first portion of the mask line ML2 has a width larger than that of the first mesh electrode line MEL1. Moreover, the width of the first portion is sufficiently large such that it covers (e.g., completely covers) the first mesh electrode line MEL1 in the overlapping patterning region OR.

Referring to FIG. 5B, when the second patterning process is complete, the first mesh electrode line MEL1 in the overlapping patterning region OR remains intact, i.e., none of the first mesh electrode line MEL1 in the overlapping patterning region OR is removed in the second patterning process. A second mesh electrode line MEL2 is formed in the second patterning region PR2 outside of the overlapping patterning region OR. As shown in FIG. 5B, the first mesh electrode line MEL1 in the overlapping patterning region OR has a uniform line width that is no less than that of the first mesh electrode line MEL1 outside of the overlapping patterning region OR. Optionally, the width of the first mesh electrode line MEL1 in the overlapping patterning region OR is substantially the same as that of the first mesh electrode line MEL1 outside of the overlapping patterning region OR. In FIG. 5A, the first portion has a rectangular shape. The first mesh electrode line MEL1 and the second mesh electrode line MEL2 are electrically connected in the overlapping patterning region OR.

Figure 6A:
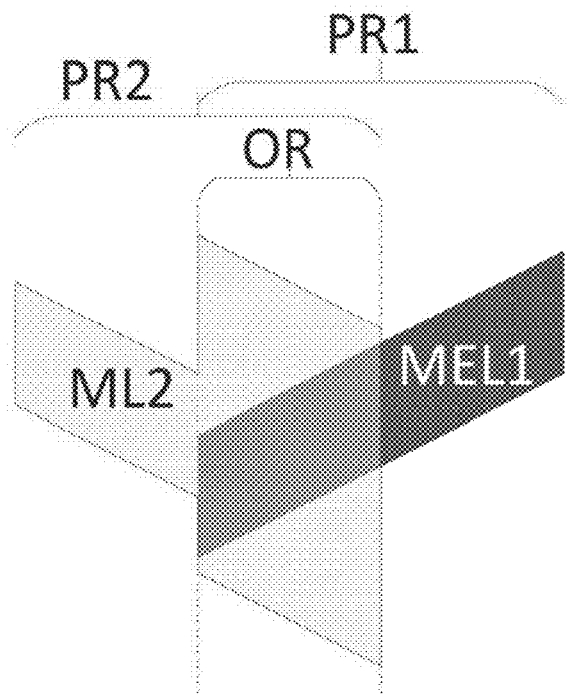
FIGS. 6A-6C illustrate a patterning process in some embodiments according to the present disclosure.
Figure 6B:
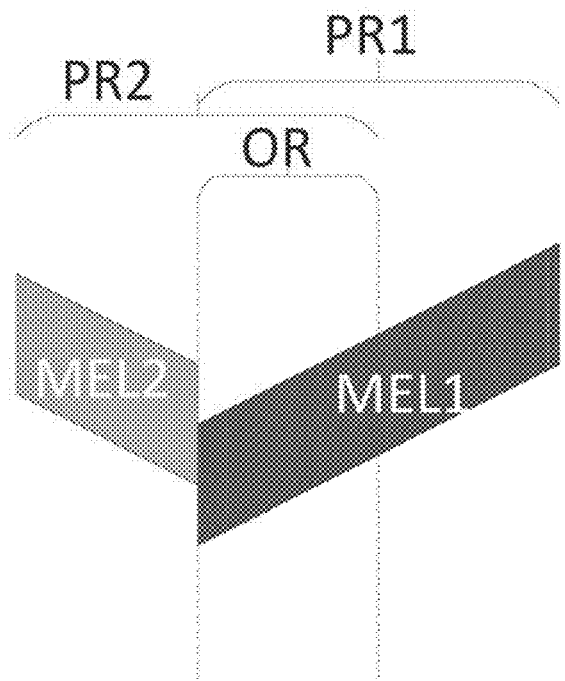
Figure 6C:
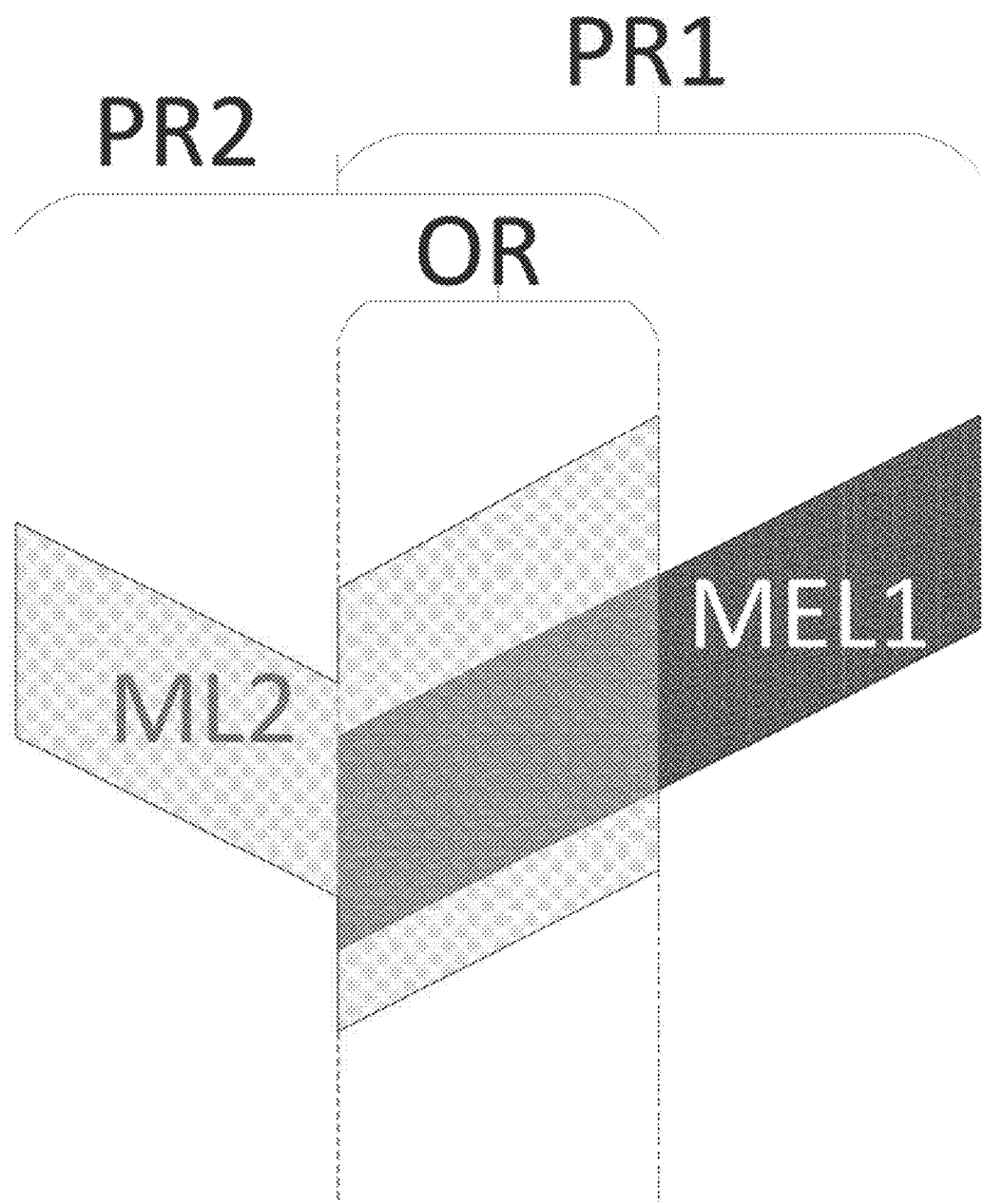

FIGS. 6A-6C illustrate a patterning process in some embodiments according to the present disclosure. Referring to FIG. 6A, in a first patterning process, a first mesh electrode line MEL1 is formed in a first patterning region PR1 (including an overlapping patterning region OR). The first mesh electrode line MEL1 is at an angle with the mask line ML2 to be used in the second patterning process. The mask line ML2 has a first portion in the overlapping patterning region OR and a second portion outside of the overlapping patterning region OR in the second patterning region PR2. The first portion of the mask line ML2 has a width larger than that of the first mesh electrode line MEL1, and sufficiently large such that it covers (e.g., completely covers) the first mesh electrode line MEL1 in the overlapping patterning region OR. The first portion has a parallelogram shape. The width of the first mesh electrode line MEL1 in the overlapping patterning region OR is substantially the same as that of the first mesh electrode line MEL1 outside of the overlapping patterning region OR. The first mesh electrode line MEL1 and the second mesh electrode line MEL2 are electrically connected in the overlapping patterning region OR.

In FIG. 6A, the first portion of the mask line ML2 in the overlapping patterning region OR extends along a direction substantially parallel to the second portion of the mask line ML2 in the second patterning region PR2. Referring to 6C, the first portion of the mask line ML2 in some embodiments extends along a direction substantially parallel to the first mesh electrode line MEL1 in the overlapping patterning region OR. The first portion of the mask line ML2 has a width larger than that of the first mesh electrode line MEL1, and sufficiently large such that it covers (e.g., completely covers) the first mesh electrode line MEL1 in the overlapping patterning region OR. Optionally, the first portion has a parallelogram shape. By having this design, the first mesh electrode line MEL1 can be covered by a first portion of the mask line ML2 having a width smaller than that in FIG. 6A.

Figure 7A:
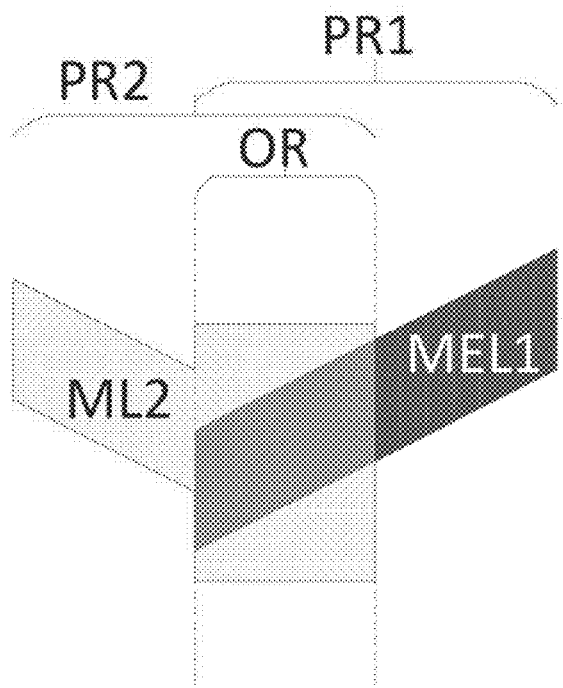
FIGS. 7A-7B illustrate a patterning process in some embodiments according to the present disclosure.
Figure 7B:
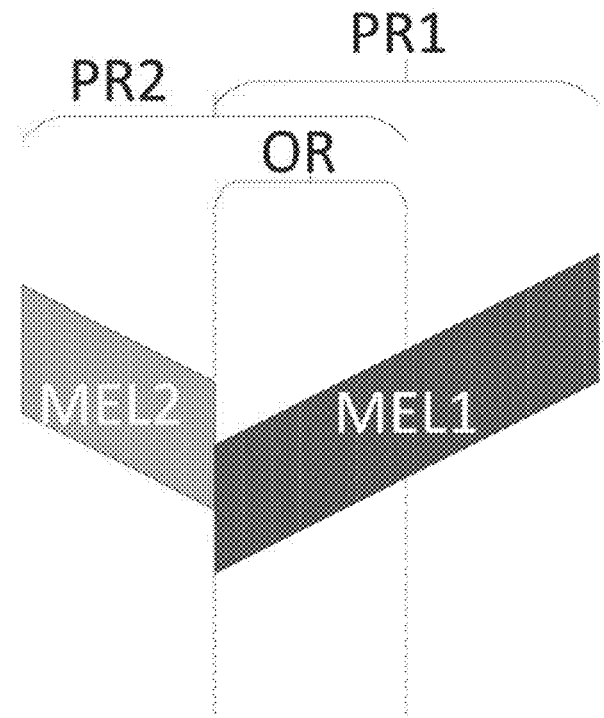

The first portion of the mask line ML2 may have any appropriate shape. FIGS. 7A-7B illustrate a patterning process in some embodiments according to the present disclosure. As shown in FIG. 7A, the first portion of the mask line ML2 has a width larger than that of the first mesh electrode line MEL1, and sufficiently large such that it covers (e.g., completely covers) the first mesh electrode line MEL1 in the overlapping patterning region OR. The first portion has a rectangular shape.

Figure 8A:
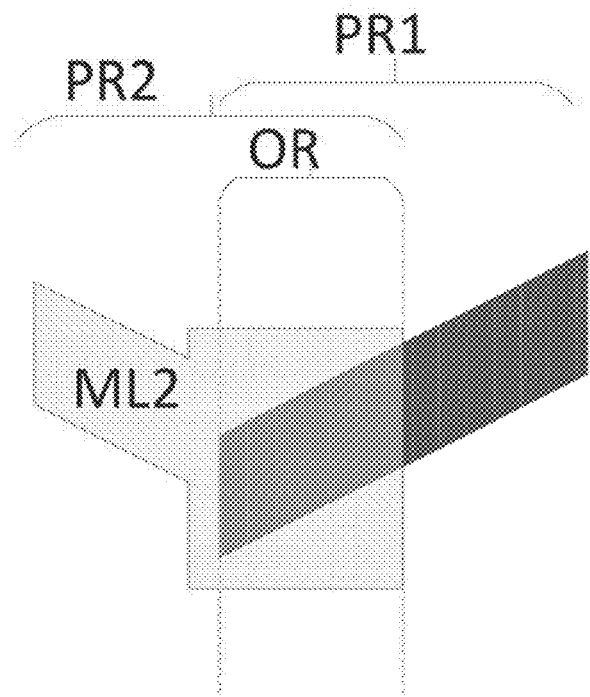
FIGS. 8A-8B illustrate a patterning process in some embodiments according to the present disclosure.
Figure 8B:
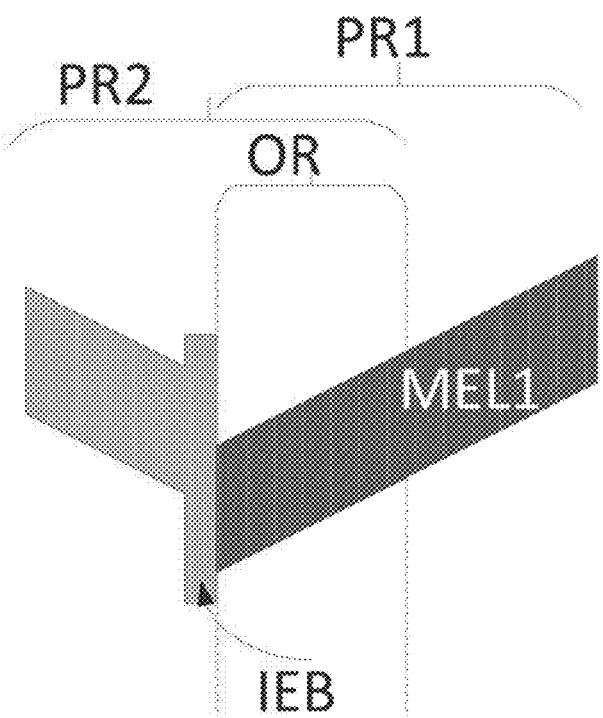

In FIGS. 5A-5B, 6A-6C, and 7A-7B, the first mesh electrode line MEL1 and the second mesh electrode line MEL2 are directly connected to each other in the overlapping patterning region OR. Optionally, they may be electrically connected through an interface electrode block. FIGS. 8A-8B illustrate a patterning process in some embodiments according to the present disclosure. Referring to FIG. 8A, the first portion of the mask line ML2 covers the overlapping patterning region OR and a small region in the second patterning region PR2. As a result, when she second patterning process is complete, an interface electrode block IEB is formed in the second patterning region PR2. The first mesh electrode line MEL1 is electrically connected to the second mesh electrode line MEL2.

Accordingly, in one aspect, the present disclosure provides a touch substrate including a base substrate and a touch electrode layer on the base substrate. In some embodiments, the touch electrode layer includes a first region having a plurality of first mesh electrode patterns, a second region having a plurality of second mesh electrode patterns corresponding to the plurality of first mesh electrode patterns, and an interface region between the first region and the second region; each of the plurality of first mesh electrode patterns including a plurality of first mesh electrode lines having a first line width, a corresponding second mesh electrode pattern including a plurality of second mesh electrode lines having a first line width corresponding to the plurality of first mesh electrode lines; the plurality of first mesh electrode lines extend from the first region into the interface region; a pair of corresponding first mesh electrode line and second mesh electrode line being electrically connected to each other in the interface region.

FIG. 9 is a diagram illustrating the structure of a touch substrate in some embodiments according to the present disclosure. Referring to FIG. 9, the touch electrode layer of the touch substrate includes a first region R1, a second region R2, and an interface region IR between the first region R1 and the second region R2. In the first region R1, the touch electrode layer includes a plurality of first mesh electrode patterns MEP1. In the second region R2, the touch electrode layer includes a plurality of second mesh electrode patterns MEP2 corresponding to the plurality of first mesh electrode patterns MEP1. As shown in FIG. 9, each of the plurality of first mesh electrode patterns MEP1 includes a plurality of first mesh electrode lines MEL1 having a first line width. Each of the plurality of second mesh electrode patterns MEP2 includes a plurality of second mesh electrode lines MEL2 having the first line width. The plurality of first mesh electrode lines MEL1 extend from the first region R1 into the interface region IR. A pair of corresponding first mesh electrode line MEL1 and second mesh electrode line MEL2 are electrically connected to each other in the interface region IR. The first mesh electrode line MEL1 in the interface region IR has a second line width no less than the first line width, i.e., the first mesh electrode line MEL1 in the interface region IR is not narrower than the first mesh electrode line MEL1 in the first region R1 or the second mesh electrode line MEL2 in the second region R2. Optionally, the first mesh electrode line MEL1 in the interface region IR has a width substantially the same as those of the first mesh electrode line MEL1 in the first region R1 and the second mesh electrode line MEL2 in the second region R2.

Figure 10:
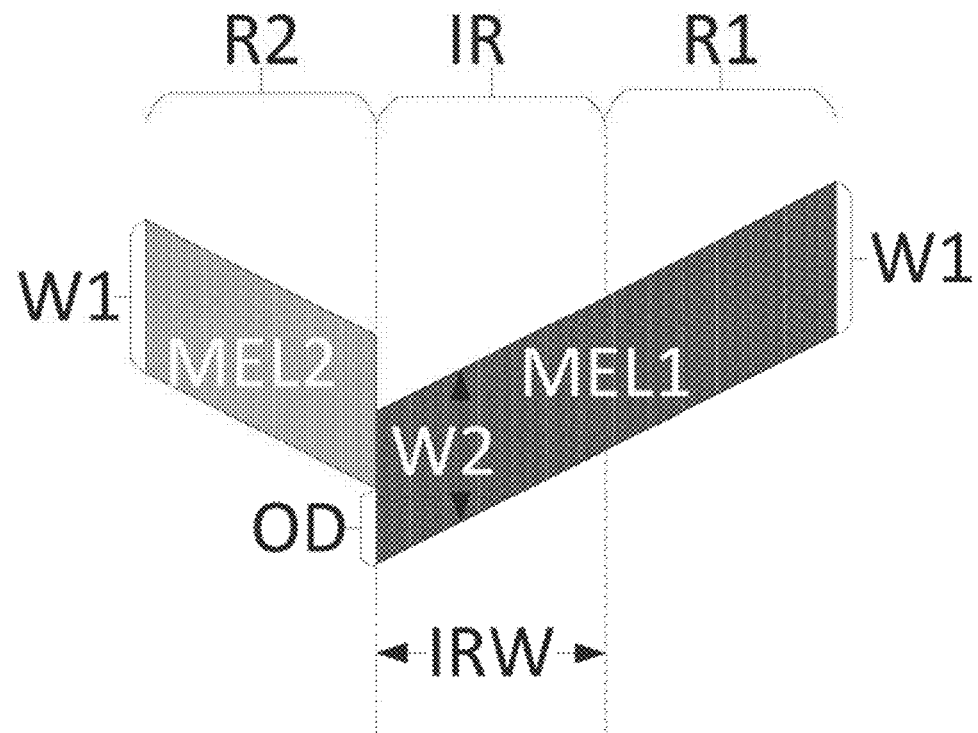
FIG. 10 is a zoom-in view of the dotted area Z in FIG. 9.

FIG. 10 is a zoom-in view of the dotted area Z in FIG. 9. Referring to FIG. 10, the first mesh electrode line MEL1 has a first line width W1 in the first region R1, and the second mesh electrode line MEL2 in the second region R2 has a width substantially the same as the first mesh electrode line MEL1 in the first region R1, i.e., the second mesh electrode line MEL2 also has a first line width W1. The first mesh electrode line MEL1 in the interface region IR has a second line width W2. The second line width W2 is no less than the first line width W1. As shown in FIG. 10, the second line width W2 is substantially the same as the first line width W1. Moreover, the first mesh electrode line MEL1 in the interface region IR has a substantially uniform width.

Optionally, the first mesh electrode line MEL1 in the interface region IR is offset from the corresponding second mesh electrode line MEL2 by an offset width OD. The offset width OD is less than the first line width W1. Optionally, the offset width OD is less than one half of the first line width W1, e.g., less than one a quarter of the first line width W1.

The interface region IR may have any appropriate width. Optionally, the interface region IR corresponds to the overlapping patterning region OR shared by the first patterning region PR1 and the second patterning region PR2 as discussed in connection with FIGS. 5A-5B, 6A-6C, and 7A-7B. Optionally, the interface region has a width IRW along a direction from the second region to the first region in a range of approximately 1 mm to approximately 5 mm, e.g., approximately 1 mm to approximately 3 mm.

Figure 11:
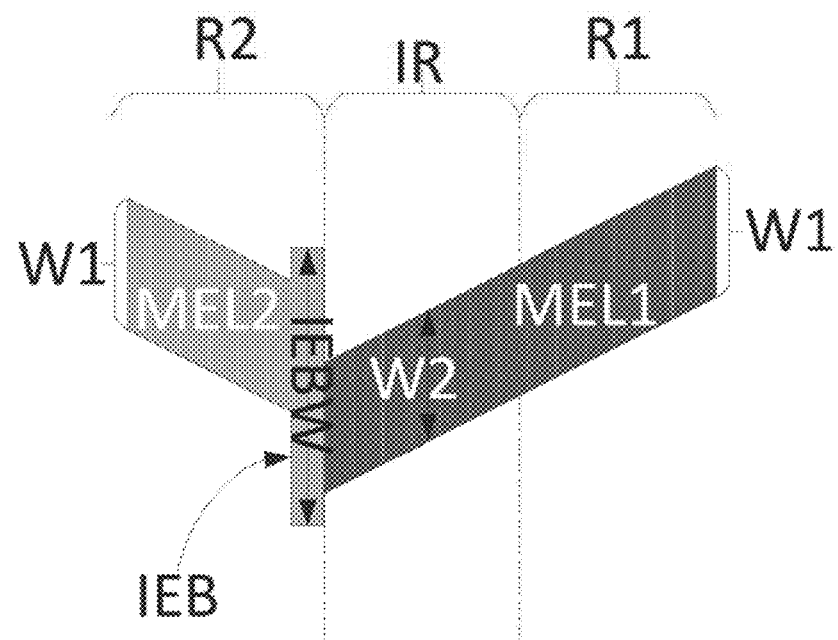
FIG. 11 is a diagram illustrating the structure of a touch electrode layer around an interface region in some embodiments according to the present disclosure.

In FIG. 10, the first mesh electrode line MEL1 and the second mesh electrode line MEL2 are directly connected to each other in the interface region IR. In some embodiments, the first mesh electrode line and the second mesh electrode line are electrically connected through an interface electrode block. FIG. 11 is a diagram illustrating the structure of a touch electrode layer around an interface region in some embodiments according to the present disclosure. Referring to FIG. 11, the first mesh electrode line MEL1 and the second mesh electrode line MEL2 are electrically connected through an interface electrode block IEB. The interface electrode block IEB has a width IEBW along a direction substantially parallel to the width direction of the first mesh electrode line MEL1 and the second mesh electrode line MEL2. Optionally, the width IEBW is larger than the first line width W1 and the second line width W2.

Figure 12:
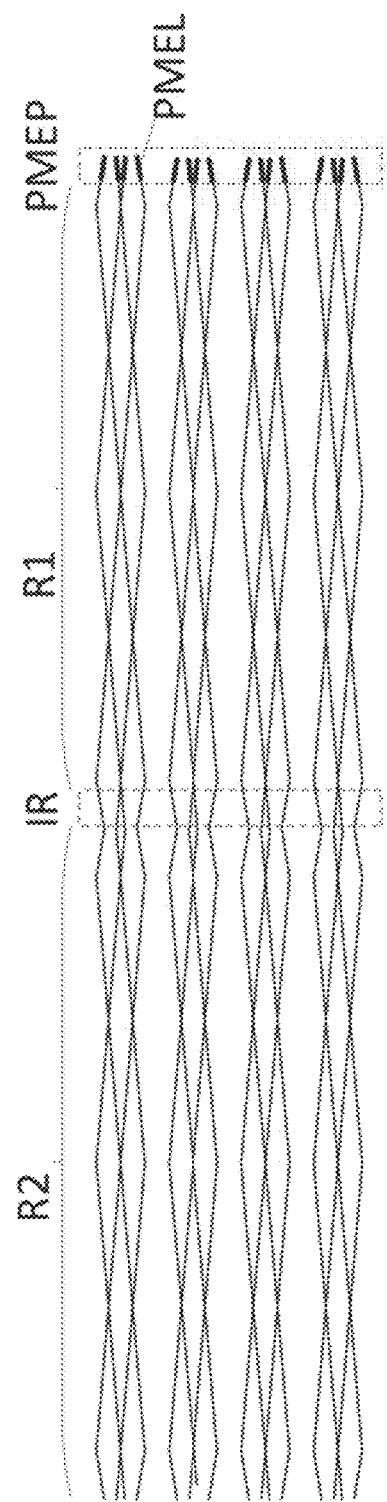
FIG. 12 is a diagram illustrating the structure of a touch substrate in some embodiments according to the present disclosure.

FIG. 12 is a diagram illustrating the structure of a touch substrate in some embodiments according to the present disclosure. Referring to FIG. 12, the touch electrode layer of the touch substrate in the embodiment further includes a peripheral mesh electrode pattern PMEP having a plurality of peripheral mesh electrode lines PMEL. The peripheral mesh electrode pattern PMEP are disposed along an edge of the touch electrode layer, i.e., the peripheral mesh electrode pattern PMEP is not adjacent to another touch electrode pattern. Optionally, the peripheral mesh electrode lines PMEL of the peripheral mesh electrode pattern PMEP are connected to a plurality of touch electrode signal lines (not shown in FIG. 12) along the edge of the touch electrode layer.

The peripheral mesh electrode lines have a line width larger than the first line width of the first mesh electrode line or the second mesh electrode line. For example, in some touch electrode layers, the first line width and the second line width are approximately 8 μm; and the peripheral mesh electrode line has a line width in a range of approximately 13 μm to approximately 20 μm. Optionally, the peripheral mesh electrode lines have a line width of approximately 16 μm.

Various appropriate conductive electrode material may be used for making the mesh electrode pattern of the touch electrode layer in the present disclosure. In some embodiments, the conductive electrode material for making the mesh electrode pattern is a transparent conductive electrode material. Examples of conductive electrode materials for making the mesh electrode pattern of the touch electrode layer include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the mesh electrode pattern is made of a metal mesh such as a nano-silver mesh.

Figure 13:
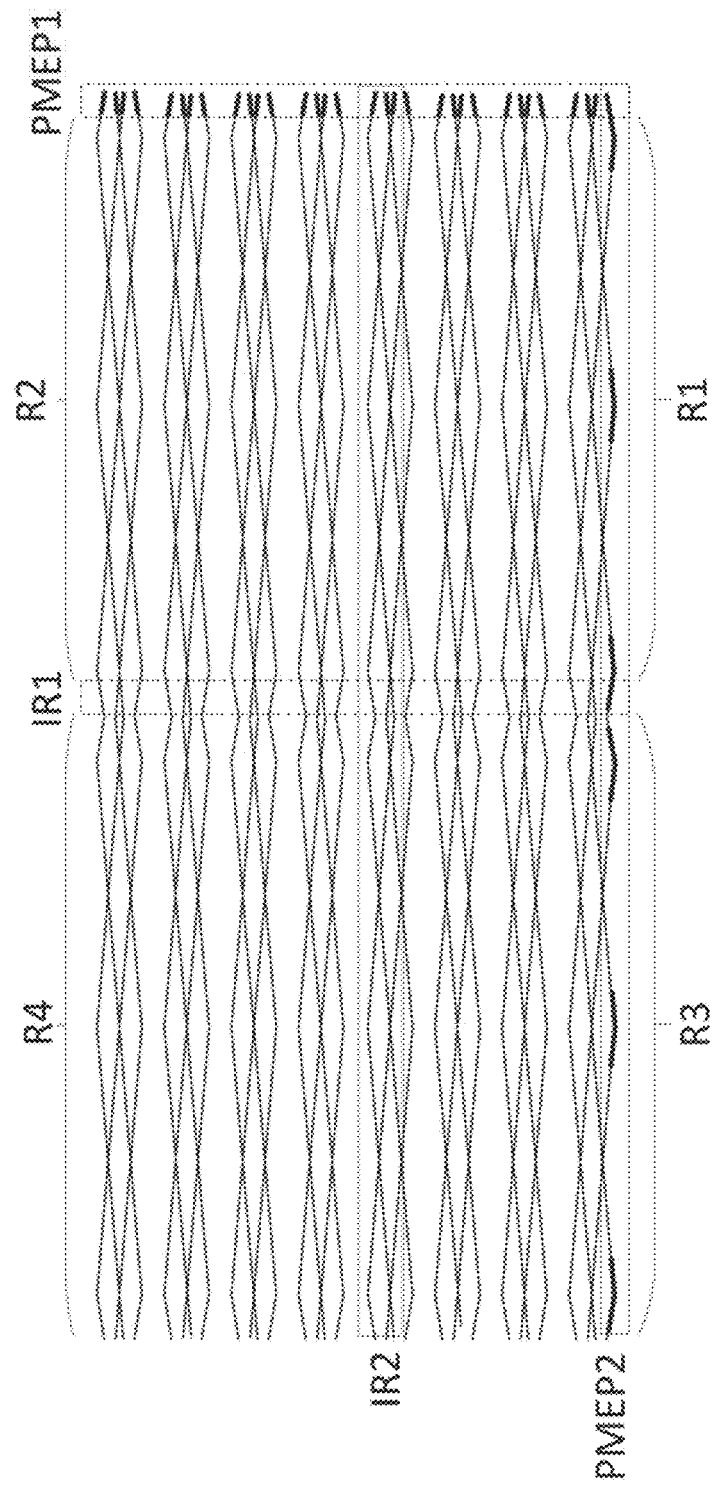
FIG. 13 is a diagram illustrating the structure of a touch substrate in some embodiments according to the present disclosure.

In some embodiments, the touch electrode layer may include more than one peripheral mesh electrode patterns or more than one interface regions. FIG. 13 is a diagram illustrating the structure of a touch substrate in some embodiments according to the present disclosure. Referring to FIG. 13, the touch electrode layer in the embodiment includes a first region R1, a second region R2, a third region R3, and a fourth region R4. The first region R1, the second region R2, the third region R3, and the fourth region R4 may be, e.g., the result of four patterning processes using a same mask plate. For example, the first region R1 may be formed in the first patterning process, the second region R2 in a second patterning process following the second patterning process, the third region R3 in a third patterning process following the second patterning process, and the fourth region R4 in the final patterning process. The first patterning process may be performed in a first patterning region, and the second patterning process may be performed in a second patterning region, the second patterning region overlaps with the first patterning region, and the overlapping patterning region corresponds to a portion of the second interface region IR2 (the right half of the second interface region IR2). The third patterning process may be performed in a third patterning region, the third patterning region overlaps with the first patterning region, and the overlapping patterning region corresponds to a portion of the first interface region IR1 (the bottom half of the first interface region IR1). The fourth patterning process may be performed in a fourth patterning region, the fourth patterning region overlaps with the second patterning region, and the overlapping patterning region corresponds to a portion of the first interface region IR1 (the upper half of the first interface region IR1). The fourth patterning region also overlaps with the third patterning region, and the overlapping patterning region corresponds to a portion of the second interface region IR2 (the left half of the second interface region IR2).

As shown in FIG. 13, the touch electrode layer in the embodiment include two interface regions, i.e., a first interface region IR1 and a second interface region IR2. The first interface region IR1 is between the first region R1 and the third region R3, and between the second region R2 and the fourth region R4. The touch electrode layer includes two peripheral mesh electrode patterns, i.e., a first peripheral mesh electrode pattern PMEP1 and a second peripheral mesh electrode pattern PMEP2. The first peripheral mesh electrode pattern PMEP1 is along a first edge of the touch electrode layer, and the second peripheral mesh electrode pattern PMEP2 is along a second edge of the touch electrode layer.

In some embodiments, the touch substrate is a mutual capacitance touch substrate. The touch substrate includes a touch sensing electrode layer and a touch scanning electrode layer, and an insulating layer between the touch sensing electrode layer and the touch scanning electrode layer. Optionally, the touch sensing electrode layer is a mesh electrode layer as described herein having a touch sensing electrode pattern, and the touch scanning electrode layer is also a mesh electrode layer as described herein having a touch scanning electrode pattern. For example, in some embodiments, the touch sensing electrode layer includes a first region having a plurality of first mesh electrode patterns, a second region having a plurality of second mesh electrode patterns corresponding to the plurality of first mesh electrode patterns, and a first interface region between the first region and the second region; each of the plurality of first mesh electrode patterns including a plurality of first mesh electrode lines having a first line width, a corresponding second mesh electrode pattern including a plurality of second mesh electrode lines having the first line width corresponding to the plurality of first mesh electrode lines; the plurality of first mesh electrode lines extend from the first region into the first interface region; a pair of corresponding first mesh electrode line and second mesh electrode line being electrically connected to each other in the first interface region. The touch scanning electrode layer includes a third region having a plurality of third mesh electrode patterns, a fourth region having a plurality of fourth mesh electrode patterns corresponding to the plurality of third mesh electrode patterns, and a second interface region between the third region and the fourth region; each of the plurality of third mesh electrode patterns including a plurality of third mesh electrode lines having a third line width, a corresponding fourth mesh electrode pattern including a plurality of fourth mesh electrode lines having the third line width corresponding to the plurality of third mesh electrode lines; the plurality of third mesh electrode lines extend from the third region into the second interface region; a pair of corresponding third mesh electrode line and fourth mesh electrode line being electrically connected to each other in the second interface region. The first mesh electrode line in the first interface region has a second line width no less than the first line width. The third mesh electrode line in the second interface region has a fourth line width no less than the third line width. Optionally, the first line width is substantially the same as the second line width. Optionally, the third line width is substantially the same as the fourth line width. Optionally, the first line width, the second line width, the third line width, and the fourth line width are all substantially the same.

In another aspect, the present disclosure provides a mask plate for fabricating the mesh electrode touch electrode layer described herein. In some embodiments, the mask plate includes a plurality of first mask patterns, each of the plurality of first mask patterns including a plurality of first mask lines having a first line width; and a second mask pattern including a plurality of second mask lines having a second line width larger than the first line width, the plurality of second mask lines being disposed along an edge of the mask plate.

Figure 14:
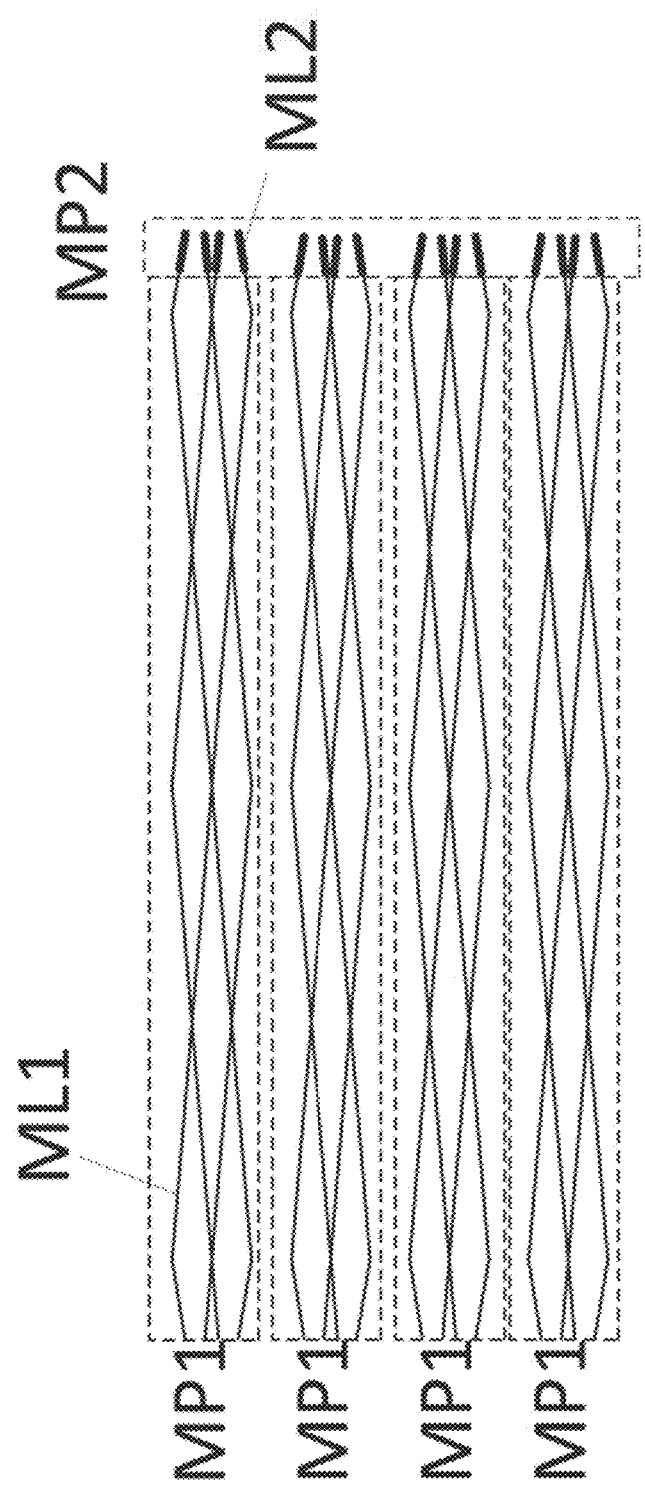
FIG. 14 is a diagram illustrating the structure of a mask plate in some embodiments according to the present disclosure.

FIG. 14 is a diagram illustrating the structure of a mask plate in some embodiments according to the present disclosure. Referring to FIG. 14, the mask plate in the embodiment includes a plurality of first mask patterns MP1 and a second mask pattern MP2. Each of the plurality of first mask patterns MP1 includes a plurality of first mask lines ML1 having a first line width. The second mask pattern MP2 includes a plurality of second mask lines ML2 having a second line width larger than the first line width. As shown in FIG. 14, the plurality of second mask lines ML2 are disposed along an edge of the mask plate.

Optionally, the first line width is approximately 8 μm; and the second line width is in a range of approximately 13 μm to approximately 20 μm. Optionally, the second line width is approximately 16 μm.

Figure 15:
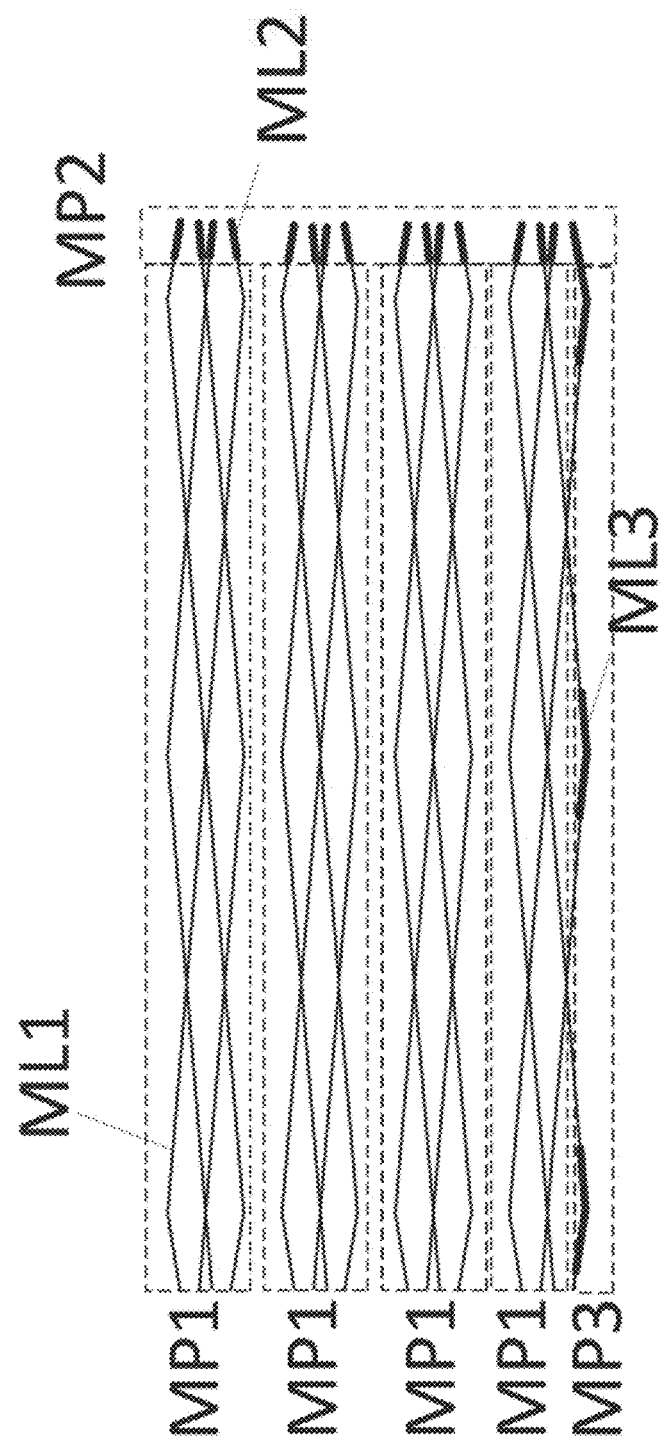
FIG. 15 is a diagram illustrating the structure of a mask plate in some embodiments according to the present disclosure.

FIG. 15 is a diagram illustrating the structure of a mask plate in some embodiments according to the present disclosure. Referring to FIG. 15, the mask plate in the embodiment includes a plurality of first mask patterns MP1, a second mask pattern MP2, and a third mask pattern MP3. Each of the plurality of first mask patterns MP1 includes a plurality of first mask lines ML1 having a first line width. The second mask pattern MP2 includes a plurality of second mask lines ML2 having a second line width larger than the first line width. The third mask pattern MP3 includes a plurality of third mask lines ML3 having a third line width larger than the first line width. As shown in FIG. 15, the plurality of second mask lines ML2 are disposed along a first edge of the mask plate, and the plurality of third mask lines ML3 are disposed along a second edge of the mask plate.

Optionally, the first line width is approximately 8 μm; the second line width is in a range of approximately 13 μm to approximately 20 μm, and the third line width is in a range of approximately 13 μm to approximately 20 μm. Optionally, the second line width is approximately 16 μm. Optionally, the third line width is approximately 16 μm.

Figure 16:
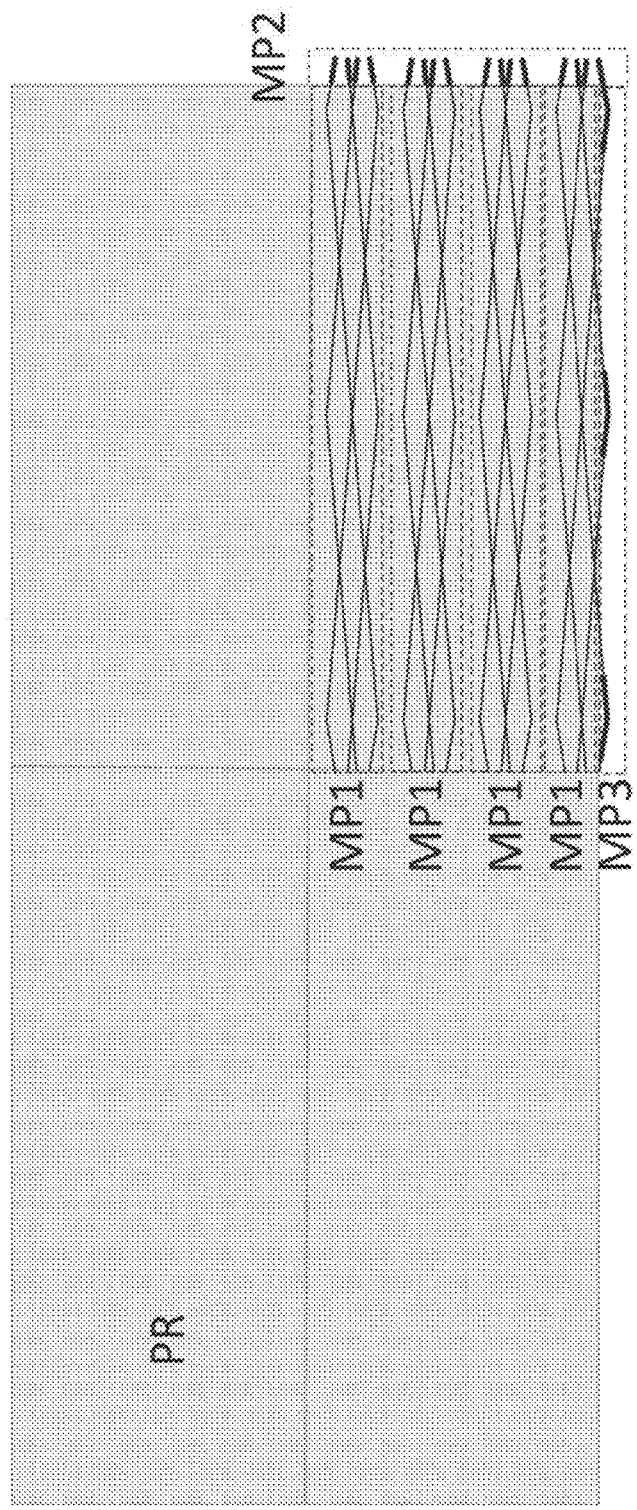
FIG. 16 illustrates a process of exposing a photoresist layer using a mask plate in some embodiments according to the present disclosure.

In some embodiments, a touch electrode layer without a peripheral mesh electrode pattern having a plurality of peripheral mesh electrode lines having a line width larger than the first line width may be fabricated using a mask plate of the present disclosure. FIG. 16 illustrates a process of exposing a photoresist layer using a mask plate in some embodiments according to the present disclosure. As shown in FIG. 16, a conductive electrode material layer (not explicitly shown in FIG. 16) is deposited on a base substrate, a photoresist layer is formed on the conductive electrode material layer, and a mask plate of FIG. 15 is placed a first patterning region (e.g., a region corresponding to the first region R1 in FIG. 13) for exposure and development. The mask plate in the embodiment includes a plurality of first mask patterns MP1, a second mask pattern MP2, and a third mask pattern MP3. Each of the plurality of first mask patterns MP1 includes a plurality of first mask lines ML1 having a first line width. The second mask pattern MP2 includes a plurality of second mask lines ML2 having a second line width larger than the first line width. The third mask pattern MP3 includes a plurality of third mask lines ML3 having a third line width larger than the first line width. As shown in FIG. 16, the second mask pattern MP2 and the third mask pattern MP3 are placed outside of the base substrate. Thus, a peripheral mesh electrode pattern will not be formed along the edge of the touch electrode layer.

In some embodiments, for forming the plurality of first mesh electrode patterns in the first region of the touch electrode layer, e.g., the first region of the photoresist layer in which exposure, development and subsequent etching steps are to be performed, a second mask plate may be used. Optionally, the second mask plate is a mask plate that only includes the plurality of first mask patterns and does not include the second mask pattern. Once the plurality of first mesh electrode patterns in the first region of the touch electrode layer is formed, a mask plate having the second mask pattern including the plurality of second mask lines having a larger line width is then utilized for forming mesh electrode patterns in other regions of the touch electrode layer.

In another aspect, the present disclosure provides a method of fabricating a touch electrode layer. In some embodiments, the method includes forming a conductive electrode material layer including a conductive electrode material on a base substrate; forming a photoresist layer including a photoresist material on a side of the conductive electrode material layer distal to the base substrate; placing a mask plate on a first region of the photoresist layer to perform exposure; developing the exposed photoresist layer; and removing the photoresist layer and the conductive electrode material layer in the exposed area, thereby forming a plurality of first mesh electrode patterns.

Optionally, the first patterning step in the first region of the photoresist layer to be patterned may be performed using a "regular" mask plate, i.e., a mask plate having only the plurality of first mask patterns but not the second mask pattern. Optionally, the first patterning step in the first region of the photoresist layer to be patterned may be performed using a mask plate having a plurality of first mask patterns and a second mask pattern as described herein, provided that the second mask pattern is placed outside of the base substrate or outside of the photoresist layer and underlying conductive electrode material layer. As a result, only a plurality of first mesh electrode patterns are formed in the first region. Optionally, both the plurality of first mesh electrode patterns and a peripheral mesh electrode pattern are to be formed on the base substrate. In some examples, the first patterning step in the first region of the photoresist layer to be patterned is performed using a mask plate having a plurality of first mask patterns and a second mask pattern as described herein. The mask plate is placed on the first region and a peripheral region of the photoresist layer; the peripheral region corresponding to the second mask pattern; the first region and the peripheral region of the photoresist layer are exposed with the mask plate. The photoresist layer in the first region and the peripheral region are exposed and developed, thereby forming the plurality of first mesh electrode patterns and the peripheral mesh electrode pattern. In some embodiments, the subsequent patterning steps following the first patterning step are performed using the mask plate having the plurality of first mask patterns and the second mask pattern as described herein.

Accordingly, in some embodiments, the method of fabricating a touch electrode layer includes forming a conductive electrode material layer comprising a conductive electrode material on a base substrate; forming a photoresist layer comprising a photoresist material on a side of the conductive electrode material layer distal to the base substrate; placing the mask plate having a plurality of first mask patterns and a second mask pattern on a first region of the photoresist layer. The first region corresponds to the plurality of first mask patterns. Each of the plurality of first mask patterns includes a plurality of first mask lines having a first line width, the second mask pattern includes a plurality of second mask lines having a second line width larger than the first line width. The plurality of second mask lines are arranged along an edge of the mask plate.

Optionally, the method further includes exposing the first region of the photoresist layer with the mask plate; developing the exposed photoresist layer in the first region to obtain a photoresist pattern including a first section corresponding to the plurality of first mask patterns in the first region and a second section outside of the first section in the first region, the photoresist material in the second section is removed; and removing the conductive electrode material layer in the second section, thereby forming a plurality of first mesh electrode patterns in the first region. Each of the plurality of first mesh electrode patterns includes a plurality of first mesh electrode lines having the first line width.

In some embodiments, the mask plate is placed on both the first region and a peripheral region of the photoresist layer; the peripheral region corresponding to the second mask pattern; the first region and the peripheral region of the photoresist layer are exposed with the mask plate. The photoresist pattern so obtained includes the first section corresponding to the plurality of first mask patterns in the first region, the second section outside of the first section in the first region, a third section corresponding to the second mask pattern in the peripheral region, and a fourth section outside of the third section in the peripheral region. Once the photoresist material in the second section and the fourth section is removed, the conductive electrode material layer in the second section and the fourth section is removed (e.g., by etching). The plurality of first mesh electrode patterns are formed in the first region, and a peripheral mesh electrode pattern is formed in the peripheral region. Each of the plurality of first mesh electrode patterns includes a plurality of first mesh electrode lines having the first line width, the peripheral mesh electrode pattern includes a plurality of peripheral mesh electrode lines having a second line width larger than the first line width.

Subsequent patterning steps are then performed using the mask plate having the plurality of first mask patterns and one or more second mask pattern. In some embodiments, the method of fabricating the touch electrode layer includes placing the mask plate on the photoresist layer. A first portion of the mask plate corresponding to the plurality of first mask patterns is placed on a second region of the photoresist layer. A second portion of the mask plate corresponding to the second mask pattern is placed on an interface region of the photoresist layer. The second region is non-overlapping with the first region. The interface region overlaps with the first region, i.e., the interface region is a part of the first region abutting the second region. The mask plate is disposed on the photoresist layer so that the plurality of second mask lines completely cover the plurality of first mesh electrode lines in the interface region, i.e., a projection of the plurality of first mesh electrode lines in the interface region on the base substrate is completely within a projection of the plurality of second mask lines in the interface region on the base substrate (because the line width of the second mask line is larger than that of the first mesh electrode line). The method further includes exposing the second region and the interface region of the photoresist layer with the mask plate; developing the exposed photoresist layer in the second region and the interface region to obtain a photoresist pattern including a fifth section corresponding to the plurality of first mask patterns in the second region, a sixth section corresponding to the second mask pattern in the interface region, and a seventh section outside of the fifth section and the sixth section in the second region and the interface region. The photoresist material in the sixth section is removed to expose the conductive electrode material layer underneath the photoresist layer in the sixth section. The conductive electrode material layer in the sixth section is then removed (e.g., etched). The mesh electrode pattern formed in the patterning step includes a plurality of second mesh electrode patterns in the second region. Each of the plurality of second mesh electrode patterns includes a plurality of second mesh electrode lines corresponding to the plurality of first mesh electrode lines. Because the line width of the second mask line is larger than that of the first mesh electrode line, the plurality of first mesh electrode lines in the interface region remain unremoved (e.g., protected by the photoresist layer and not etched). A pair of corresponding first mesh electrode line and second mesh electrode line are electrically connected to each other in the interface region. The first mesh electrode line remained in the interface region has a line width no less than (e.g., substantially the same as) the first line width.

Optionally, the first mesh electrode line in the interface region is formed to be offset from the corresponding second mesh electrode line by an offset width. Optionally, the offset width is less than the first line width. Optionally, the offset width is less than one half of the first line width, e.g., less than one quarter of the first line width.

Optionally, the interface region has a width along a direction from the second region to the first region in a range of approximately 1 mm to approximately 5 mm.

Optionally, the first mesh electrode line in the interface region has a substantially uniform width that is substantially the same as the first line width.

Optionally, the first mesh electrode line and the second mesh electrode line are directly connected to each other in the interface region.

Optionally, the first mesh electrode line and the second mesh electrode line are electrically connected through an interface electrode block having a width larger than the first line width and the second line width. To form such a touch electrode layer, a mask plate having three portions may be used. A first portion of the mask plate corresponding to the plurality of first mask patterns is placed on a second region of the photoresist layer. A second portion of the mask plate corresponding to the second mask pattern is placed on an interface region of the photoresist layer. A third portion of the mask plate corresponding to the interface electrode block is placed on the second region of the photoresist layer (see, e.g., FIGS. 8A-8B). The third portion is between the first portion and the second portion. The mask plate may include a plurality of interface mask block corresponding to the plurality of second mask lines and the plurality of first mask lines. Each pair of corresponding interface mask block and second mask line may optionally be an integral piece (as shown in FIGS. 8A-8B). The interface region overlaps with the first region, i.e., the interface region is a part of the first region abutting the second region. The mask plate is disposed on the photoresist layer so that the plurality of second mask lines completely cover the plurality of first mesh electrode lines in the interface region, i.e., a projection of the plurality of first mesh electrode lines in the interface region on the base substrate is completely within a projection of the plurality of second mask lines in the interface region on the base substrate (because the line width of the second mask line is larger than that of the first mesh electrode line). The method further includes exposing the second region and the interface region of the photoresist layer with the mask plate; developing the exposed photoresist layer in the second region and the interface region to obtain a photoresist pattern including a fifth section corresponding to the plurality of first mask patterns and the plurality of interface mask blocks in the second region, a sixth section corresponding to the second mask pattern in the interface region, and a seventh section outside of the fifth section and the sixth section in the second region and the interface region. The photoresist material in the sixth section is removed to expose the conductive electrode material layer underneath the photoresist layer in the sixth section. The conductive electrode material layer in the sixth section is then removed (e.g., etched). The mesh electrode pattern formed in the patterning step includes a plurality of second mesh electrode patterns and a plurality of interface electrode blocks in the second region. Each of the plurality of second mesh electrode patterns includes a plurality of second mesh electrode lines corresponding to the plurality of first mesh electrode lines. Because the line width of the second mask line is larger than that of the first mesh electrode line, the plurality of first mesh electrode lines in the interface region remain unremoved (e.g., protected by the photoresist layer and not etched). A pair of corresponding first mesh electrode line and second mesh electrode line are electrically connected to each other in the interface region through an interface electrode block having a width larger than the first line width. The first mesh electrode line remained in the interface region has a line width no less than (e.g., substantially the same as) the first line width.

Optionally, the touch electrode layer so formed includes a peripheral mesh electrode pattern including a plurality of peripheral mesh electrode lines having a line width larger than the first line width along one or more edge of the touch electrode layer. Optionally, the first line width is approximately 8 µm; and the peripheral mesh electrode line has a line width in a range of approximately 13 µm to approximately 20 µm, e.g., 16 µm.

Various appropriate conductive electrode materials and various appropriate fabricating methods may be used to make the touch electrode layer. For example, a conductive electrode material may be deposited on the substrate, e.g., by sputtering or vapor deposition or solution coating; and patterned. Examples of conductive electrode materials for making the mesh electrode pattern of the touch electrode layer include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the mesh electrode pattern is made of a metal mesh such as a nano-silver mesh.

Optionally, the touch substrate is a mutual capacitance touch substrate. The method includes forming a touch sensing electrode layer, forming a touch scanning electrode layer, and forming an insulating layer between the touch sensing electrode layer and the touch scanning electrode layer. The steps of forming the touch sensing electrode layer and the step of forming the touch scanning electrode layer may be performed according to the method of fabricating the touch electrode layer described herein.

Optionally, the photoresist material used in forming the touch electrode layer is a positive photoresist material.

In another aspect, the present disclosure provides a method of fabricating a touch panel. In some embodiments, the method of fabricating the touch panel includes forming a black matrix layer on a substrate; and forming a touch electrode layer according to a method of fabricating the touch electrode layer described herein. Because the mask plate for forming the black matrix layer is also smaller than a large size display panel, multiple patterning steps are also needed for forming the black matrix layer.

Figure 17A:
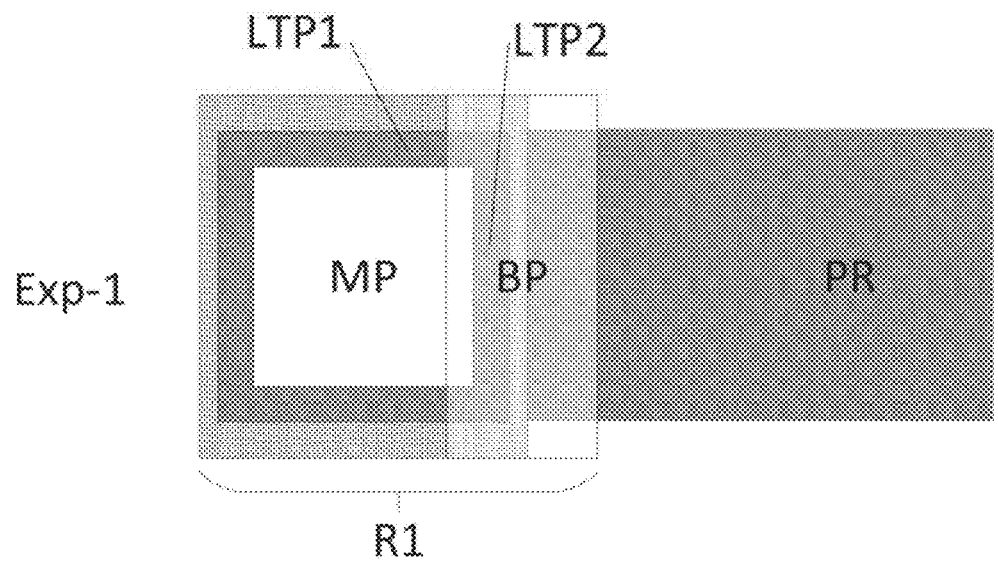
FIGS. 17A-17E illustrate a process of forming a black matrix layer in a touch panel in some embodiments according to the present disclosure.

FIGS. 17A-17E illustrate a process of forming a black matrix layer in a touch panel in some embodiments according to the present disclosure. Referring to FIGS. 17A-17E, the method in the embodiment includes four exposure steps, Exp-1, Exp-2, Exp-3, and Exp-4. Prior to the exposure, the method includes forming a black matrix material layer including a black matrix material on a base substrate; and forming a photoresist layer on a side of the black matrix material layer distal to the base substrate. Referring to FIG. 17A, in the first exposure step Exp-1, a mask plate MP is place on a first region R1 of the photoresist layer PR. The mask plate MP has a first light transmissive portion LTP1 corresponding to a portion of the black matrix layer, and a second light transmissive portion LTP2 outside the black matrix layer (see FIG. 17E for a black matrix layer BM formed by the process).

As shown in FIG. 17A, the method further includes a step of shielding the photoresist layer PR in an area corresponding to the second light transmissive portion LTP2 from exposure using a baffle plate BP. For example, the baffle plate BP may be placed between UV light and the mask plate MP, e.g., on a side of the mask plate MP distal to the photoresist layer PR. Optionally, the baffle plate BP may be placed between the mask plate MP and the photoresist layer PR, e.g., on a side of the photoresist layer PR proximal to the mask plate MP and on a side of the mask plate MP proximal to the photoresist layer PR.

Once the baffle plate BP is placed on the photoresist layer PR, the method further includes exposing the first region R1 of the photoresist layer PR with the mask plate MP and the baffle plate BP; developing the exposed photoresist layer PR in the first region R1 to obtain a photoresist pattern corresponding to the first light transmissive portion LTP1. The photoresist material in the first region R1 outside of an area corresponding to the first light transmissive portion LTP1 is removed. Subsequently, the black matrix material in the first region R1 outside of the area corresponding to the first light transmissive portion LTP1 is removed, thereby forming a portion of the black matrix.

Figure 17B:
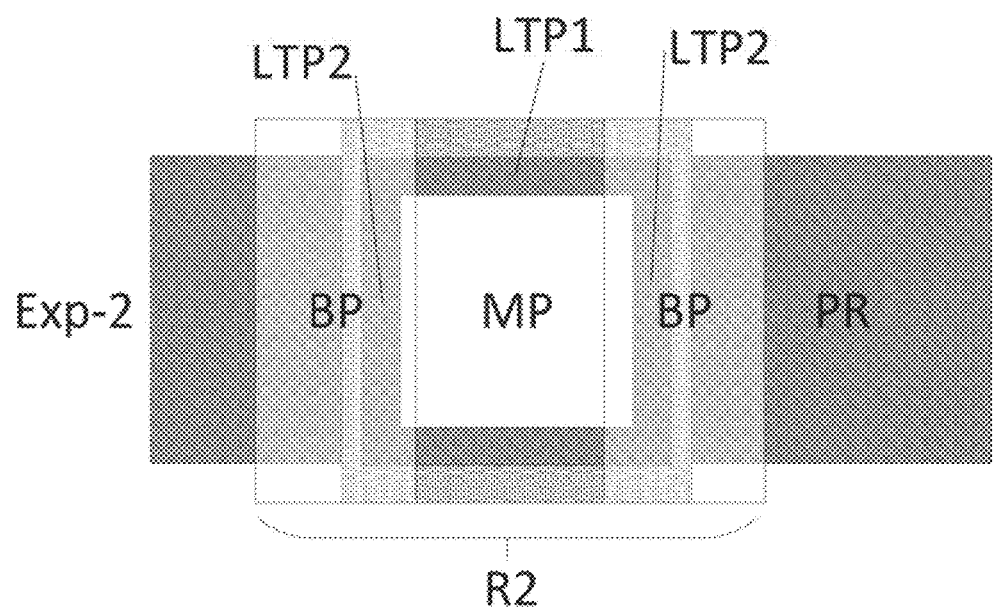
Figure 17C:
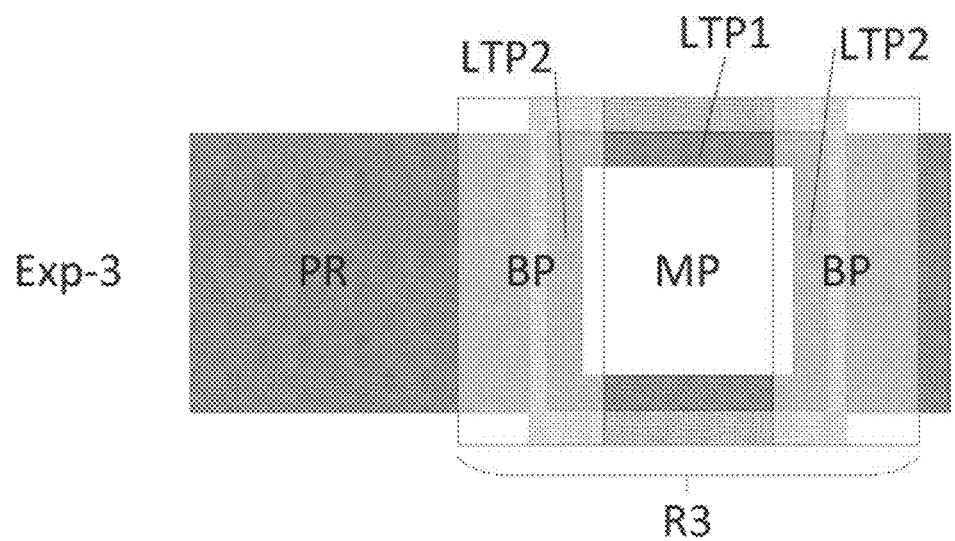
Figure 17D:
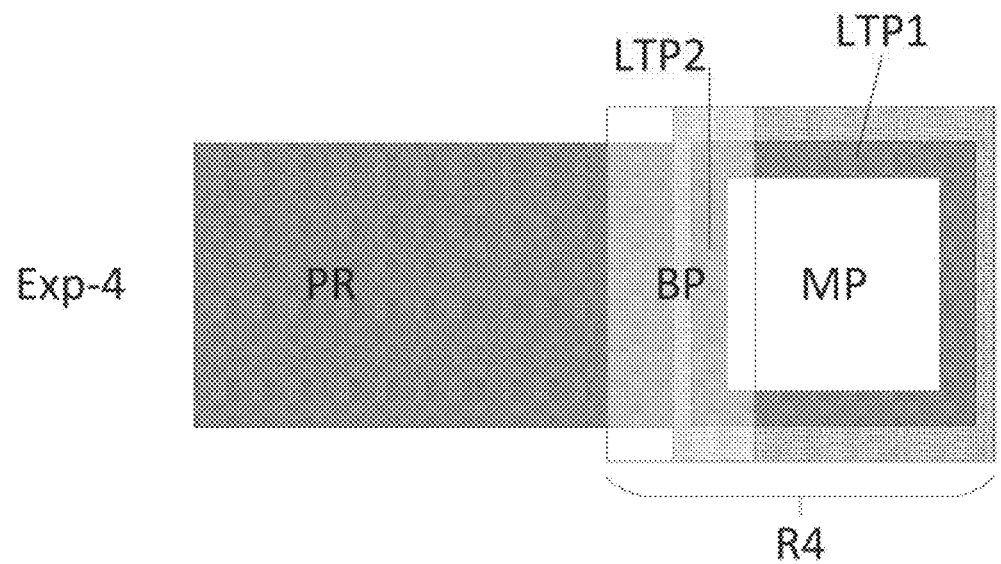
Figure 17E:
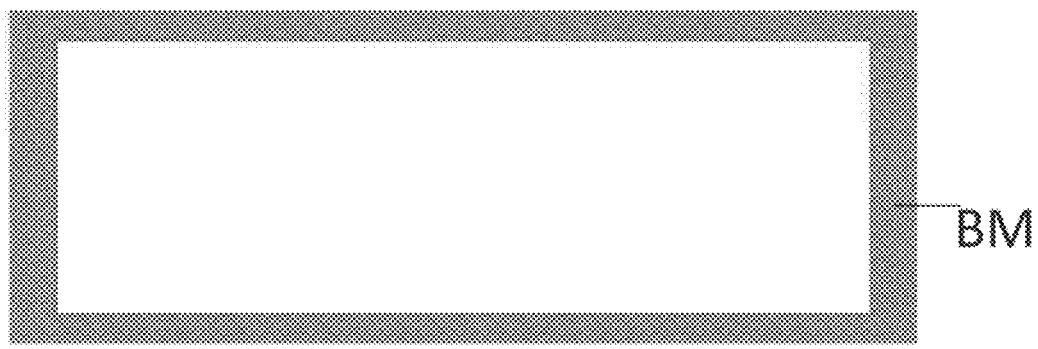

As shown in FIGS. 17B-17D, the patterning step is repeated in a second region R2, a third region R3, and a fourth region R4 of the photoresist layer PR. As shown in FIG. 17E, a black matrix layer BM is formed when four patterning steps are complete.

Optionally, the photoresist material used in forming the black matrix layer is a negative photoresist material.

In another aspect, the present disclosure provides a touch panel having a touch substrate described herein or fabricated by a method described herein.

In another aspect, the present disclosure provides a touch display apparatus having a touch panel described herein or fabricated by a method described herein. Examples of appropriate touch display apparatuses includes, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
a base substrate; and
a touch electrode layer on the base substrate comprising a first region having a plurality of first mesh electrode patterns, a second region having a plurality of second mesh electrode patterns corresponding to the plurality of first mesh electrode patterns, and an interface region between the first region and the second region; each of the plurality of first mesh electrode patterns comprising a plurality of first mesh electrode lines having a first line width, a corresponding second mesh electrode pattern comprising a plurality of second mesh electrode lines corresponding to the plurality of first mesh electrode lines and having the first line width; the plurality of first mesh electrode lines extend from the first region into the interface region; a pair of corresponding first mesh electrode line and second mesh electrode line being electrically connected to each other in the interface region;
wherein the first mesh electrode line in the interface region has a second line width no less than the first line width; and
the first mesh electrode line in the interface region is offset from the corresponding second mesh electrode line.

2. The touch substrate of claim 1, wherein the first mesh electrode line in the interface region is offset from the corresponding second mesh electrode line by an offset width less than the first line width.

3. The touch substrate of claim 1, wherein the interface region has a width along a direction from the second region to the first region in a range of approximately 1 mm to approximately 5 mm.

4. The touch substrate of claim 1, wherein the first mesh electrode line in the interface region has a substantially uniform width; and the second line width is substantially the same as the first line width.

5. The touch substrate of claim 1, wherein the first mesh electrode line and the second mesh electrode line are directly connected to each other in the interface region.

6. The touch substrate of claim 1, wherein the first mesh electrode line and the second mesh electrode line are electrically connected through an interface electrode block having a width larger than the first line width and the second line width.

7. The touch substrate of claim 1, wherein the touch electrode layer further comprises a peripheral mesh electrode pattern along an edge of the touch electrode layer comprising a plurality of peripheral mesh electrode lines having a line width larger than the first line width.

8. The touch substrate of claim 7, wherein the first line width and the second line width are approximately 8 μm; and the peripheral mesh electrode line has a line width in a range of approximately 13 μm to approximately 20 μm.

9. The touch substrate of claim 1, wherein the touch electrode layer is a metal mesh touch electrode layer, the plurality of first mesh electrode patterns are a plurality of first metal mesh electrode patterns, and the plurality of second mesh electrode patterns are a plurality of second metal mesh electrode patterns.

10. The touch substrate of claim 1, wherein the touch electrode layer is a touch sensing electrode layer; the touch substrate further comprising a touch scanning electrode layer, and an insulating layer between the touch sensing electrode layer and the touch scanning electrode layer; the touch scanning electrode layer comprising:

a third region having a plurality of third mesh electrode patterns, a fourth region having a plurality of fourth mesh electrode patterns corresponding to the plurality of third mesh electrode patterns, and a second interface region between the third region and the fourth region; each of the plurality of third mesh electrode patterns comprising a plurality of third mesh electrode lines having a third line width, a corresponding fourth mesh electrode pattern comprising a plurality of fourth mesh electrode lines corresponding to the plurality of third mesh electrode lines and having the third line width; the plurality of third mesh electrode lines extend from the third region into the second interface region; a pair of corresponding third mesh electrode line and fourth mesh electrode line being electrically connected to each other in the second interface region;

wherein the third mesh electrode line in the interface region has a fourth line width no less than the third line width.

11. A touch panel, comprising a touch substrate of claim 1; and a black matrix.

12. A touch display apparatus, comprising a touch panel of claim 11.

\* \* \* \* \*